United States Patent
Dabov et al.

(10) Patent No.: US 8,250,724 B2
(45) Date of Patent: Aug. 28, 2012

(54) METHOD FOR HANDHELD COMPUTER DEVICE

(75) Inventors: Teodor Dabov, San Francisco, CA (US); Hui Leng Lim, San Jose, CA (US); Kyle Yeates, Palo Alto, CA (US); Stephen Brian Lynch, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 255 days.

(21) Appl. No.: 12/712,900

(22) Filed: Feb. 25, 2010

(65) Prior Publication Data

US 2010/0146766 A1 Jun. 17, 2010

Related U.S. Application Data

(63) Continuation of application No. 12/205,824, filed on Sep. 5, 2008, now Pat. No. 7,697,281.

(51) Int. Cl.
*B21D 39/03* (2006.01)

(52) U.S. Cl. ........ 29/428; 29/525.01; 29/592.1; 29/557; 29/407.05

(58) Field of Classification Search ............. 29/428, 29/557, 592.1, 525.01, 407.05; 345/161, 345/157, 156, 152, 153; 361/679, 753, 685, 361/686, 679.02, 731; 455/575.1, 566, 97; 65/442, 446, 388, 389

See application file for complete search history.

(56) References Cited

U.S. PATENT DOCUMENTS

| | | | |
|---|---|---|---|
| 5,045,971 A | 9/1991 | Ono et al. | |
| 5,128,829 A | 7/1992 | Loew | |
| 5,180,644 A | 1/1993 | Bresin et al. | |
| 5,468,947 A | 11/1995 | Danielson et al. | |
| 5,568,358 A | 10/1996 | Nelson et al. | |
| 5,737,183 A | 4/1998 | Kobayashi et al. | |
| 5,796,575 A | 8/1998 | Podwalny et al. | |
| 6,038,328 A | 3/2000 | Hsu | |
| 6,137,890 A | 10/2000 | Markow | |
| 6,144,368 A * | 11/2000 | Ooka et al. | 345/161 |
| 6,153,834 A | 11/2000 | Cole et al. | |
| 6,408,171 B1 | 6/2002 | Schuelke et al. | |
| 6,427,017 B1 | 7/2002 | Toki | |
| 6,536,589 B2 * | 3/2003 | Chang | 206/320 |
| 6,746,797 B2 | 6/2004 | Benson et al. | |
| 6,757,157 B2 | 6/2004 | Lammintaus et al. | |
| 6,781,824 B2 | 8/2004 | Krieger et al. | |
| 6,819,946 B2 | 11/2004 | Hansson | |

(Continued)

FOREIGN PATENT DOCUMENTS

EP 1209880 5/2002

(Continued)

OTHER PUBLICATIONS

Office Action dated Sep. 30, 2009 in U.S. Appl. No. 12/205,824.

(Continued)

*Primary Examiner* — Derris Banks
*Assistant Examiner* — Tai Nguyen
(74) *Attorney, Agent, or Firm* — Womble Carlyle Sandridge & Rice LLP

(57) ABSTRACT

A minimum Z height handheld electronic device and methods of assembly is described. The electronic device includes a single seamless housing having a front opening and a cover disposed within the front opening and attached to the seamless housing without a bezel.

16 Claims, 28 Drawing Sheets

U.S. PATENT DOCUMENTS

| | | | |
|---|---|---|---|
| 6,838,810 B1* | 1/2005 | Bovio et al. | 313/422 |
| 6,847,522 B2 | 1/2005 | Fan et al. | |
| 6,929,879 B2 | 8/2005 | Yamazaki | |
| 7,149,557 B2 | 12/2006 | Chadha | |
| 7,190,802 B2 | 3/2007 | Rains et al. | |
| 7,236,357 B2 | 6/2007 | Chen | |
| 7,297,439 B2 | 11/2007 | Yamazaki et al. | |
| 7,352,584 B1 | 4/2008 | Sung | |
| 7,412,267 B2 | 8/2008 | Eaton et al. | |
| 7,432,860 B2 | 10/2008 | Huynh | |
| 7,515,431 B1 | 4/2009 | Zadesky et al. | |
| 7,553,055 B2 | 6/2009 | Liu | |
| 7,558,054 B1 | 7/2009 | Prest et al. | |
| 7,558,057 B1 | 7/2009 | Naksen et al. | |
| 7,558,396 B2 | 7/2009 | Liu et al. | |
| 7,564,424 B2 | 7/2009 | Umehara | |
| 7,583,987 B2 | 9/2009 | Park | |
| 7,620,175 B2 | 11/2009 | Black et al. | |
| 7,663,607 B2 | 2/2010 | Hotelling et al. | |
| 7,668,332 B2 | 2/2010 | Williams et al. | |
| 7,688,574 B2 | 3/2010 | Zadesky et al. | |
| 7,697,281 B2 | 4/2010 | Dabov et al. | |
| 2002/0102870 A1 | 8/2002 | Burns et al. | |
| 2002/0107044 A1 | 8/2002 | Kuwata et al. | |
| 2002/0114143 A1 | 8/2002 | Morrison et al. | |
| 2003/0003945 A1 | 1/2003 | Saiki et al. | |
| 2003/0081392 A1 | 5/2003 | Cady et al. | |
| 2004/0203518 A1 | 10/2004 | Zheng et al. | |
| 2005/0014537 A1 | 1/2005 | Gammon et al. | |
| 2005/0088778 A1 | 4/2005 | Chen et al. | |
| 2005/0095745 A1 | 5/2005 | Sapir | |
| 2006/0157842 A1 | 7/2006 | Goodwin | |
| 2006/0262500 A1 | 11/2006 | Huang et al. | |
| 2007/0058821 A1 | 3/2007 | Welsh et al. | |
| 2007/0081303 A1 | 4/2007 | Lam et al. | |
| 2008/0025547 A1 | 1/2008 | Yun et al. | |
| 2008/0037765 A1 | 2/2008 | Finney et al. | |
| 2008/0037770 A1 | 2/2008 | Emmert | |
| 2008/0062660 A1 | 3/2008 | Weber et al. | |
| 2008/0069384 A1 | 3/2008 | Kim et al. | |
| 2008/0165139 A1 | 7/2008 | Hotelling et al. | |
| 2008/0165485 A1 | 7/2008 | Zadesky et al. | |
| 2008/0166004 A1 | 7/2008 | Sanford et al. | |
| 2008/0266774 A1* | 10/2008 | Tracy et al. | 361/683 |
| 2008/0316116 A1 | 12/2008 | Hobson et al. | |
| 2008/0316121 A1 | 12/2008 | Hobson et al. | |
| 2009/0049773 A1 | 2/2009 | Zadesky et al. | |
| 2009/0059485 A1 | 3/2009 | Lynch et al. | |
| 2009/0067141 A1 | 3/2009 | Dabov et al. | |
| 2009/0155681 A1 | 6/2009 | Lin et al. | |
| 2009/0257189 A1 | 10/2009 | Wang et al. | |
| 2009/0257613 A1 | 10/2009 | Khamashta et al. | |
| 2009/0302804 A1 | 12/2009 | Park et al. | |
| 2010/0008040 A1 | 1/2010 | Weber et al. | |
| 2010/0073247 A1 | 3/2010 | Arkko et al. | |

FOREIGN PATENT DOCUMENTS

| | | |
|---|---|---|
| EP | 1257147 | 11/2002 |
| EP | 1 732 230 A2 | 12/2006 |
| JP | 2003-111194 | 4/2003 |
| JP | 2004-213498 | 7/2004 |
| JP | 2005130156 A | 5/2005 |
| KR | 20070047650 A | 5/2007 |
| WO | WO 2009/056143 | 5/2009 |

OTHER PUBLICATIONS

Notice of Allowance dated Dec. 21, 2009 in U.S. Appl. No. 12/205,824.
Office Action dated Sep. 12, 2011 issued in Canadian Patent Application No. 2,735,999.
Office Action dated Sep. 9, 2011 issued in Japanese Patent Application No. 2011-526076.
Examiner's First Report dated Aug. 25, 2011 issued in Australian Patent Application No. 2011203145.
"[Comparison] Mounted parts inherited, while an arrangement inside is boldly changed," NE: Nikkei Electronics, Japan, Nikkei BP, published on Aug. 11, 2008, No. pp. 54-57.
"iPod touch hardware review," PC Watch [online], URL http://pc.watch.impress.com.jp/docs/2007/1010/apple.htm, published Oct. 10, 2007.
Tomohisa Takei et al., "Complete analysis of iPhone," NE: Nikkei Electronics, Japan, Nikkei BP, published on Jul. 16, 2007, pp. 81-88.
Notice of Allowance dated Sep. 3, 2010 in U.S. Appl. No. 12/205,826.
Office Action dated Jul. 12, 2010 in U.S. Appl. No. 12/205,826.
Ho et al., "Cost Effective Integrated Housing and Printed Circuit Module for Battery Pack," ip.com Prior Art Database, Apr. 29, 2004, 6 pgs.
International Search Report dated Dec. 27, 2010 in PCT Application No. PCT/US2009/050879.
Written Opinion dated Dec. 27, 2010 in PCT Application No. PCT/US2009/050879.
Office Action dated Oct. 25, 2010 in CN Application No. 201020179389.8.
Office Action dated Feb. 16, 2011, in CN Utility Model Application No. 201020179389.8.
International Preliminary Report on Patentability dated Mar. 8, 2011, in PCT Application No. PCT/US2009/050879.
Partial Search Report dated Oct. 7, 2010 in PCT Application No. PCT/US2009/050879.
European Office Action dated Dec. 21, 2011 for EP Patent Application No. 09790546.7.

* cited by examiner

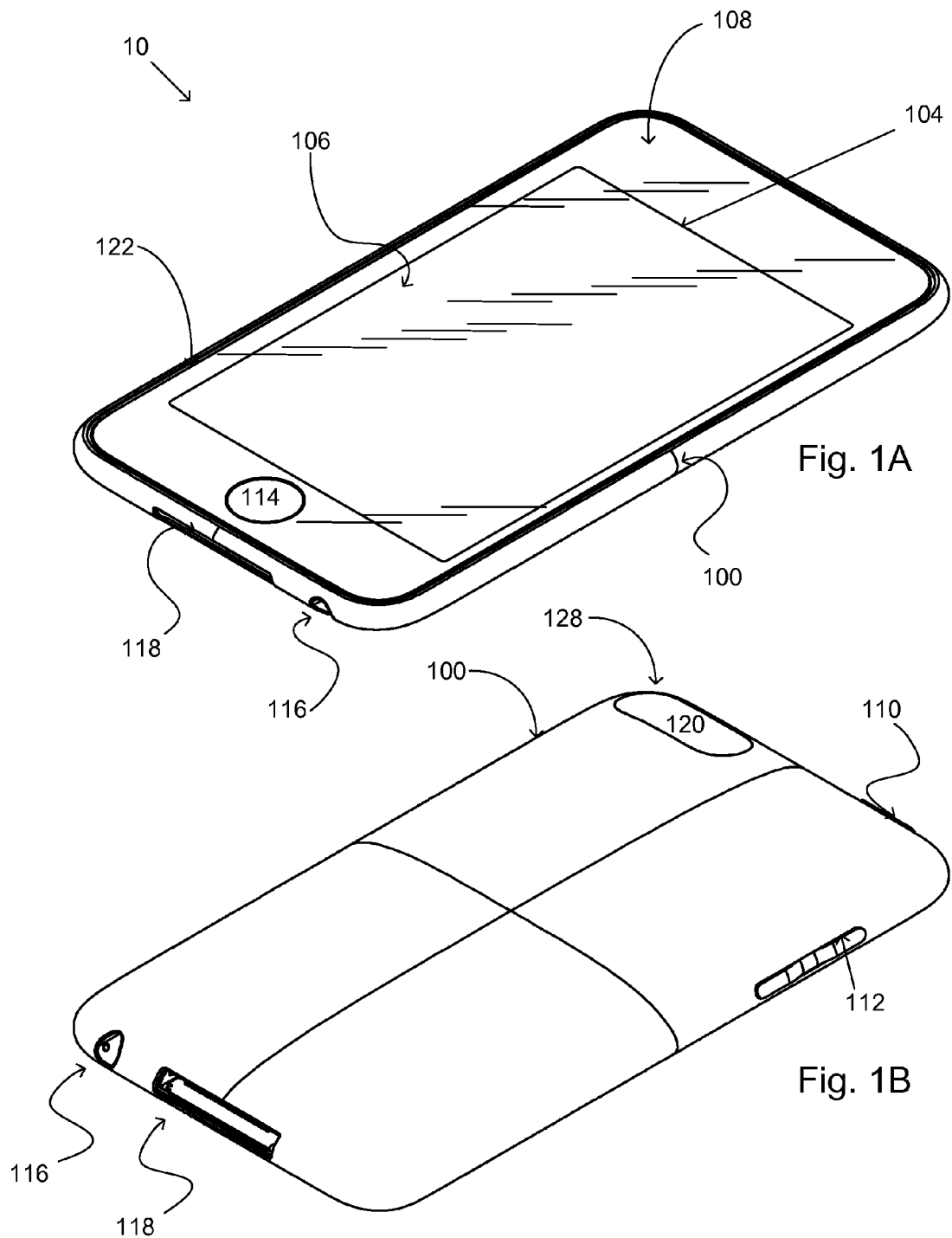

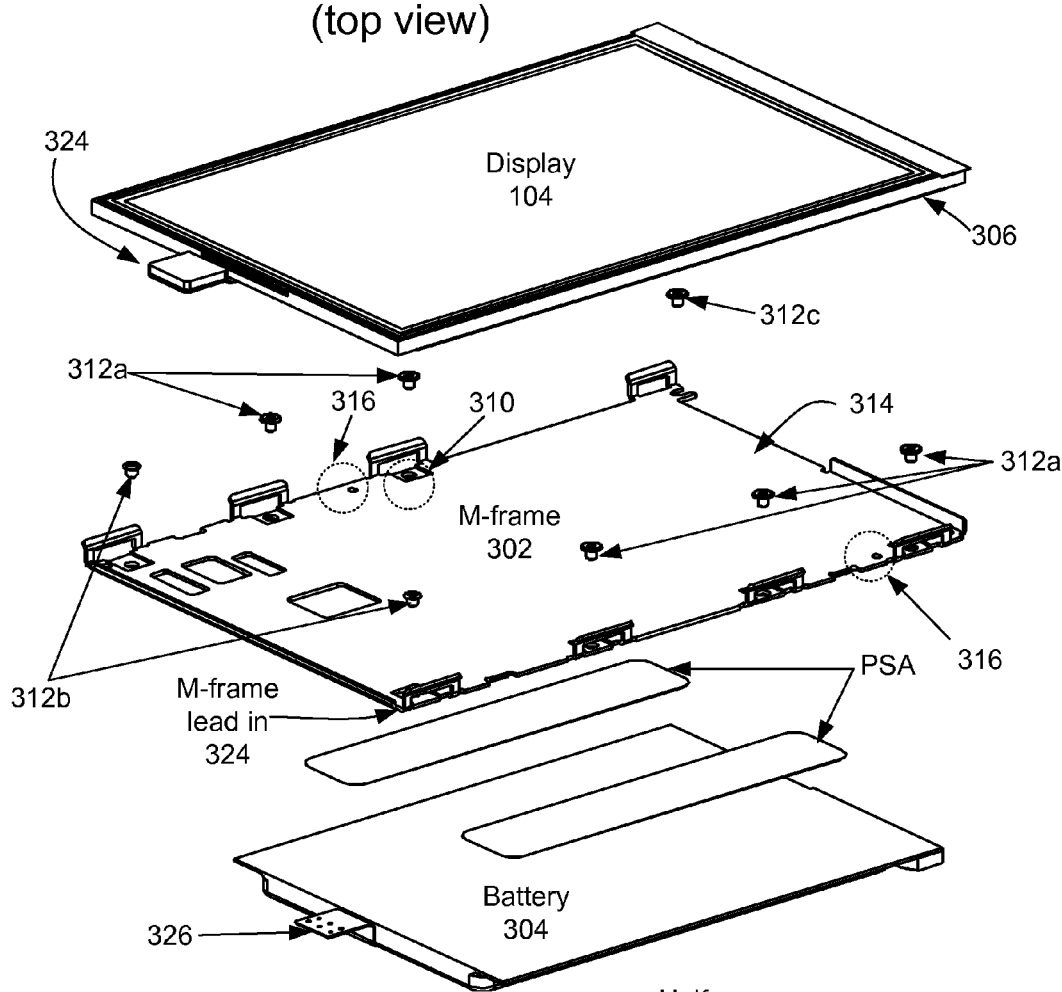
Fig. 2C
(top view)
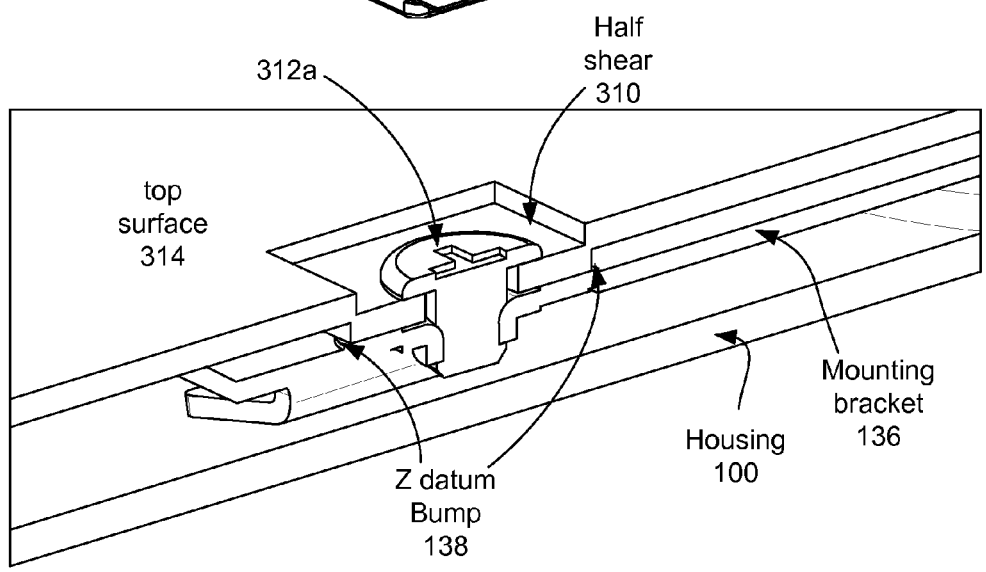

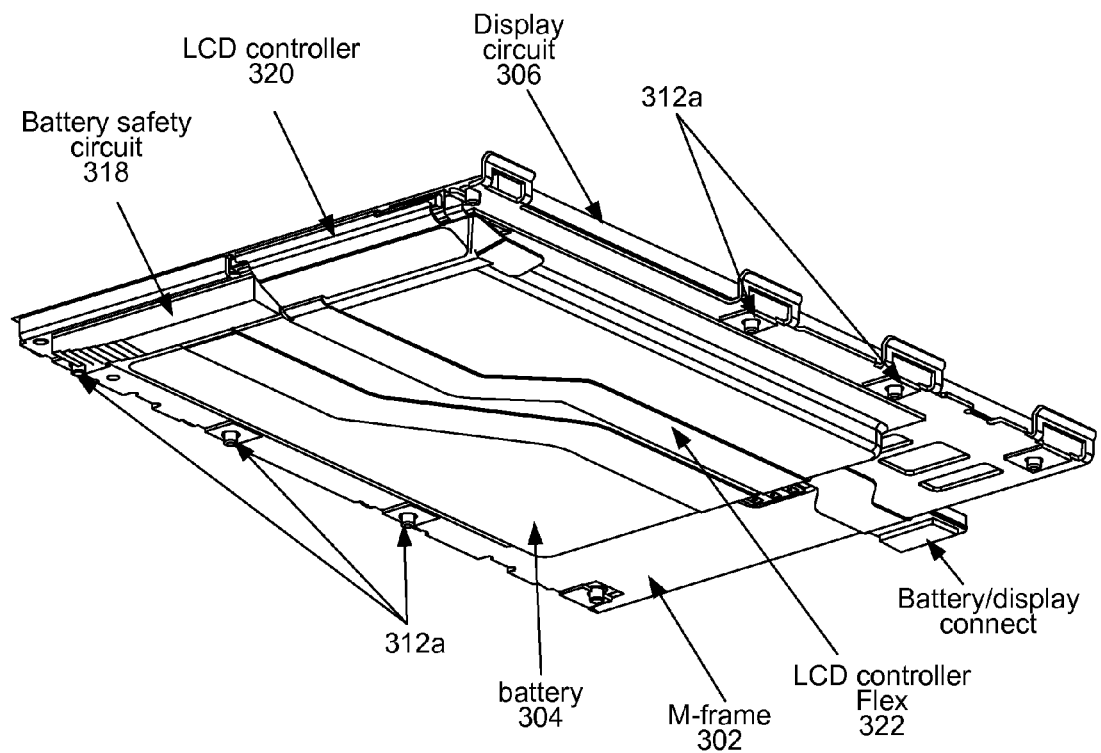

Top View

Set up prior to punching operation

After punching operation with dock opening formed

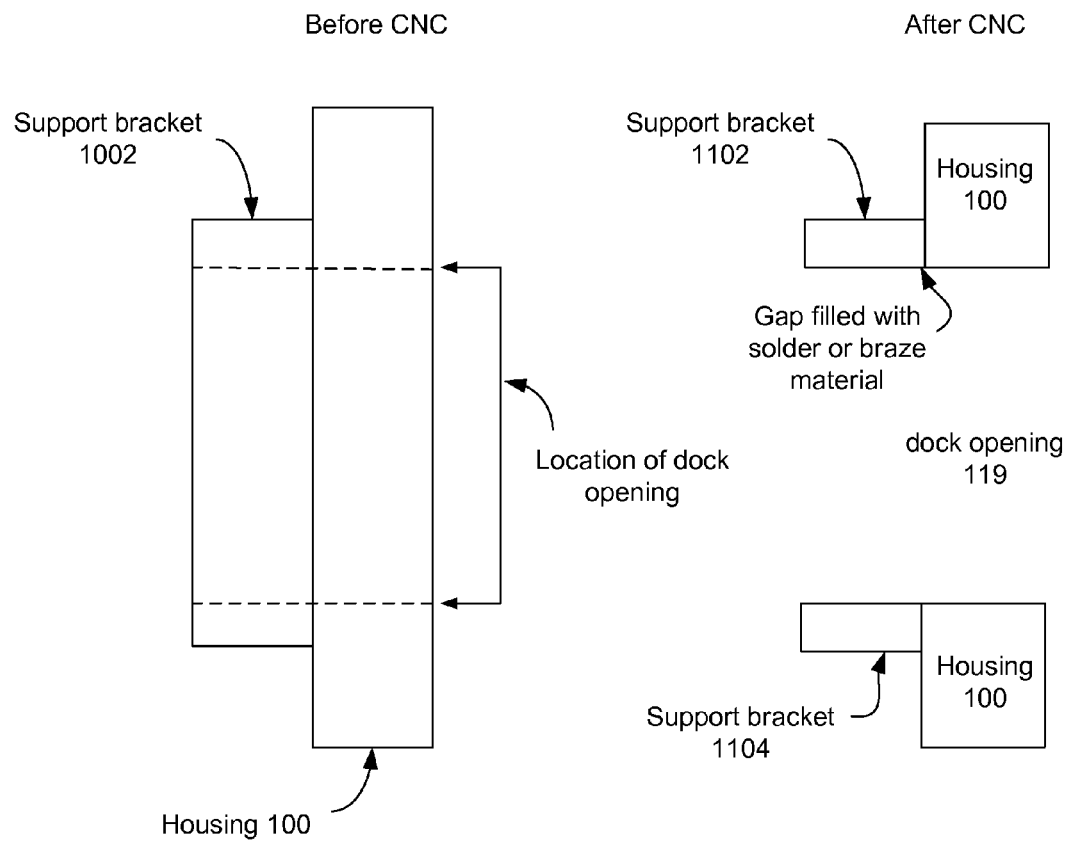

METHOD FOR HANDHELD COMPUTER DEVICE

CROSS REFERENCE TO RELATED APPLICATIONS

This application is a continuation of and claims priority under 35 USC §120 to U.S. patent application Ser. No. 12/205,824 filed Sep. 5, 2008 and is incorporated herein by reference.

This application is related to U.S. patent application Ser. No. 12/205,826 filed Sep. 5, 2008 and is incorporated herein by reference. This patent application is also related to (i) U.S. Provisional Patent Application No. 61/094,811, filed Sep. 5, 2008, entitled "ELECTROMAGNETIC INTERFERENCE SHIELDS WITH PIEZOS", which is incorporated herein by reference and (ii) U.S. Provisional Patent Application No. 61/094,816, filed Sep. 5, 2008, entitled "COMPACT HOUSING FOR PORTABLE ELECTRONIC DEVICE WITH INTERNAL SPEAKER", each of which are herein incorporated herein by reference.

BACKGROUND

1. Field of the Invention

The present invention relates generally to portable computing devices. More particularly, the present invention relates to enclosures of portable computing devices and methods of assembling portable computing devices.

2. Description of the Related Art

The outward appearance of a portable electronic device, including its design and its heft, is important to a user of the portable electronic device, as the outward appearance contributes to the overall impression that the user has of the portable electronic device. At the same time, the assembly of the portable electronic device is also important to the user, as a durable assembly will help extend the overall life of the portable electronic device and will increase its value to the user.

One design challenge associated with the portable electronic device is the design of the enclosures used to house the various internal components. This design challenge generally arises from a number conflicting design goals that includes the desirability of making the enclosure lighter and thinner, the desirability of making the enclosure stronger and making the enclosure more esthetically pleasing. The lighter enclosures, which typically use thinner plastic structures and fewer fasteners, tend to be more flexible and therefore they have a greater propensity to buckle and bow when used while the stronger and more rigid enclosures, which typically use thicker plastic structures and more fasteners, tend to be thicker and carry more weight. Unfortunately, increased weight may lead to user dissatisfaction, and bowing may damage the internal parts Furthermore, in most portable electronic devices, the enclosures are mechanical assemblies having multiple parts that are screwed, bolted, riveted, or otherwise fastened together at discrete points. For example, the enclosures typically have included an upper casing and a lower casing that are placed on top of one another and fastened together using screws. These techniques typically complicate the housing design and create aesthetic difficulties because of undesirable cracks, seams, gaps or breaks at the mating surfaces and fasteners located along the surfaces of the housing. For example, a mating line surrounding the entire enclosure is produced when using an upper and lower casing. Not only that, but assembly is often a time consuming and cumbersome process. For example, the assembler has to spend a certain amount of time positioning the two parts and attaching each of the fasteners. Furthermore, assembly often requires the assembler to have special tools and some general technical skill.

Another challenge is in techniques for mounting structures within the portable computing devices. Conventionally, the structures have been laid over one of the casings (upper or lower) and attached to one of the casings with fasteners such as screws, bolts, rivets, etc. That is, the structures are positioned in a sandwich like manner in layers over the casing and thereafter fastened to the casing. This methodology suffers from the same drawbacks as mentioned above, i.e., assembly is a time consuming and cumbersome.

Therefore, it would be beneficial to provide a portable electronic device that is aesthetically pleasing and lightweight, yet durable. It would also be beneficial to provide methods for assembling the portable electronic device.

SUMMARY OF THE INVENTION

The invention relates, in one embodiment, to a handheld electronic device. The handheld electronic devices includes at least a single seamless housing having a front opening and a cover disposed within the front opening and attached to the seamless housing without a bezel.

The invention relates, in another embodiment, to seamless housing formed of a single sheet of metal. The seamless housing includes a top opening, an integral bottom and side walls that cooperate to form a cavity in cooperation with the top opening, the bottom wall having a curved bottom surface, the side walls being rounded such that they form a curved side surface and an undercut within the cavity, an inside edge of the side walls surrounding and defining the top opening, and an outside edge, a mounting bracket attached to the bottom wall suitable for securing an electronic assembly to the bottom wall of the housing and an opening in at least one sidewall having a depth of trim at least greater than that provided by the housing alone.

The invention relates to in another embodiment to a small form factor electronic device that includes at least a seamless housing having an integral bottom and side walls that cooperate to form a cavity in cooperation with a front opening having a flat top surface, the bottom wall having a curved bottom surface, the side walls being rounded such that they form a curved side surface and an undercut within the cavity, an edge of the side walls surrounding and defining the front opening and a plurality of electronic assemblies inserted into the seamless housing through the front opening and secured to the bottom surface of the housing, wherein a Z height tolerance of the plurality of electronic assemblies is minimized such that an upper surface of a topmost electronic assembly is substantially coplanar with the flat top surface of the housing.

A method of self centering a topmost glass unit in a small form factor electronic device is also disclosed. The small form factor electronic device is formed of a seamless housing having a front opening having a flat top surface and side walls where an edge of the side walls surrounds and defines the front opening and wherein the glass unit includes an environmental seal having a tapered portion, wherein at least some of the tapered portion of the environmental seal extends beyond an inner edge of the front opening. The method can be carried out by, inserting the glass unit into the front opening and self aligning the glass unit during the insertion by, interacting of the inner edge of the front opening that the portion of the environmental seal that extends beyond the inner edge of the opening, and concurrently with the interacting of the inner edge and the extended portion of the environmental seal, glass unit fasteners cooperating with a lead in device.

In another embodiment an integrated speaker assembly suitable for use in a small form factor portable hand held device is described. The integrated speaker assembly includes at least a piezoelectric speaker arranged to produce at least audible sounds, an acoustic seal having a plurality of acoustic seal gaps that work in cooperation with the piezoelectric speaker to direct the sound produced by the piezoelectric speaker to a desired location in the small form factor portable hand held device, and an acoustic barrier arranged to prevent audible sounds leaking to undesired locations in the small form factor electronic device.

The invention relates to in another embodiment to a minimum Z height mounting bracket system to secure an operational component in a handheld computing device having a seamless enclosure. The mounting bracket includes a plurality of sacrificial z adjustment bumps having a sacrificial portion arranged along the length of the mounting bracket wherein after the mounting bracket is attached to the seamless enclosure, a top portion of the seamless enclosure and the sacrificial portion of the sacrificial z adjustment bumps are machined off concurrently with a drilling a plurality of xy alignment holes, wherein the machining and the drilling are performed in a single machine set up thereby minimizing alignment tolerance in xy and z directions.

The invention relates in another embodiment to a method of centering a racetrack between a formed edge and an inside edge of a seamless enclosure used for supporting a handheld computing device. The method is carried out by optically determining a plurality of reference points on the formed edge of the seamless enclosure and cutting the inside edge using the plurality of optical reference points.

The invention relates in another embodiment to a method of centering a racetrack between a formed edge and an inside edge of a seamless enclosure having a single open end, wherein the seamless enclosure supports a handheld computing device having display portion located in the single open end. The method is carried out by determining a center point of the display portion, determining an angle of tilt of the display portion, and cutting the inside edge based upon the center point and the angle of tilt.

BRIEF DESCRIPTION OF THE DRAWINGS

The invention will be readily understood by the following detailed description in conjunction with the accompanying drawings, wherein like reference numerals designate like structural elements, and in which:

FIGS. 1A-1B are perspective diagrams of a handheld computing device in its assembled form.

FIGS. 2A-2E are an exploded perspective diagrams of an electronic device in its unassembled form.

FIGS. 11A-11C graphically illustrate the process for forming a short span opening in the housing.

DETAILED DESCRIPTION OF THE EMBODIMENTS

Figure 1C:
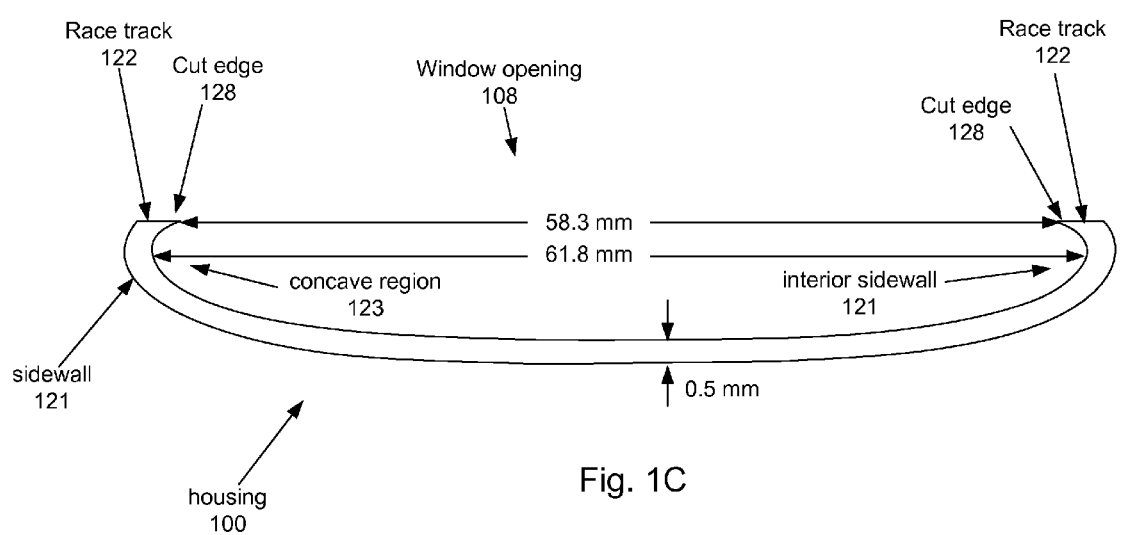
FIG. 1C is a cross sectional view of the housing highlighting the nature of the undercut geometry.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

The described embodiments relate to an aesthetically pleasing portable electronic device. The portable electronic device is formed of a curved seamless housing and an aesthetically pleasing polished flat top glass layer. The uniformity of the appearance of the portable electronic device is enhanced since unlike conventional portable electronic devices, the polished top glass layer is mounted to the seamless housing without the use of a bezel. The seamless nature of the housing and the lack of a bezel provide several advantages besides the uniform and appealing appearance. Such advantages include the fact that fewer components are required for assembly, the portable electronic device is able to more readily withstand the impact of drop event, and better protection is provided to the polished glass top layer and any sensitive operational components therein.

The seamless housing is formed from a single sheet of metal (such as stainless steel). The housing has an undercut geometry in which the linear dimensions of an opening into which the operational components are inserted during assembly are smaller than the linear dimensions of the body of the housing itself. Moreover, the curvature of the housing is asymmetric in that an upper portion of the housing is formed to have a deep spline (i.e., higher curvature) whereas a lower portion of the housing is formed to have a more shallow spline. This asymmetry aids in a user's tactile sensation in part because it provides a better fit to the user's hand. Moreover, the metallic nature of the housing provides good electrical grounding for built-in RF antenna as well as to mitigate the effects of electromagnetic interference (EMI) and electrostatic discharge (ESD).

Unlike the assembly of conventional portable electronic devices where components are assembled in a top-down manner (i.e., the components are inserted into the housing before the bezel is snapped on), the undercut geometry of the housing requires that all components fit within the smaller dimensions of the window opening in the housing. Moreover, the assembly of the portable electronic device is carried out in a bottom-up manner using what is referred to as a blind assembly. In order to facilitate the bottom-up, blind assembly of the portable electronic device and to minimize any offsets between the polished top glass layer and an uppermost portion of the housing (referred to as the racetrack), various techniques, apparatus and systems are presented that minimize stack (i.e., z direction) tolerance. For example, portions of brackets used to mount subassemblies are welded to the housing and are subsequently machined at the same time and with the same set up as a topmost portion of the housing. In this way accurate Z datums for mounting various components are provided. It should be noted that machining is preferred since machined tolerances on the order of 0.05 mm can be achieved whereas conventional weldment position tolerances are typically on the order of 0.2 mm.

Other aspects of the invention relate to specific approaches to minimizing the Z height of the assembled components. In other words, in keeping with both the aesthetic look and feel, the Z height of the portable electronic device is maintained to a value consistent with providing a favorable user experience. This can be accomplished in a number of ways in addition to those already discussed with regards to, for example, the mounting brackets. A minimum Z height speaker assembly can be fabricated using a piezoelectric speaker in combination with a horizontal acoustic barrier. Gaps in the horizontal acoustic barrier have the effect of directing the sound produced by the piezoelectric speaker to any desired location in the housing. For example, the sound can be directed to specific openings in the housing otherwise unrelated to the broadcasting of sound. Such openings can include for example a dock opening and/or an audio jack opening. Enhancing the perceived sound by providing a back volume (i.e., using the back surface of the housing as a resonator) can be achieved using existing components and an appropriately placed back volume acoustic seal. In order to assure that the back volume seal integrity is maintained in spite of the variance in Z tolerance between the shield and housing changes from device to device, adapters are placed in close proximity to the back volume acoustic seal.

Other aspects of the invention that preserve the available Z height relate to the organization of circuits associated with the battery and display screen. In particular, as described below battery and display screen circuitry co-exist in the same Y location thereby reducing the overall Y component of the circuits. In the described embodiments, the battery circuitry can include a battery safety circuit and the display circuitry can include a display controller (in the particular embodiments, the display is a liquid crystal display, LCD, and the controller is a LCD controller). Conventional designs dictate that the battery safety circuit be placed in a central portion of the battery and that the LCD controller not be aligned to a far edge of the display (this would likely increase line width and parasitic capacitance reducing the available drive of the LCD controller). Furthermore, in order to conform to the spline of the housing and to reduce the overall Z of the product, the CD controller flex is bent around the battery.

Furthermore, providing gas relief structures on a plastic frame used to mount the protective glass layer enhances the adhesion of glass layer to plastic frame. Such structures can be formed by, for example, removing predetermined sections of plastic frame in appropriate locations by punching holes of a predetermined size and location. In this way, any trapped gases, such as air, can escape providing a more uniform distribution of adhesive resulting in a stronger and more reliable bond between the glass layer and the plastic frame.

These and other embodiments of the invention are discussed below with reference to FIGS. 1-16. However, those skilled in the art will readily appreciate that the detailed description given herein with respect to these figures is for explanatory purposes as the invention extends beyond these limited embodiments.

Throughout the following discussion, the term "CNC" is used. The abbreviation CNC stands for computer numerical control and refers specifically to a computer controller that reads computer instructions and drives a machine tool (a powered mechanical device typically used to fabricate components by the selective removal of material). It should be noted however, that any appropriate machining operation can be used to implement the described embodiments and is not strictly limited to those practices associated with CNC.

FIGS. 1A-1B are perspective diagrams showing various views of fully assembled portable electronic device 10 in accordance with an embodiment of the invention. The portable electronic device 10 may be sized for one-handed operation and placement into small areas such as a pocket, i.e., the portable electronic device 10 can be a handheld pocket sized electronic device. By way of example, the electronic portable electronic device 10 may correspond to a computer, media device, telecommunication device and/or the like. The portable electronic device 10 is capable of processing data and more particularly media such as audio, video, images, etc. The portable electronic device 10 may generally correspond to a music player, game player, video player, personal digital assistant (PDA), and/or the like. With regards to being handheld, the portable electronic device 10 can be operated solely by the user's hand(s), i.e., no reference surface such as a desktop is needed. In some cases, the handheld device is sized for placement into a pocket of the user. By being pocket sized, the user does not have to directly carry the device and therefore the device can be taken almost anywhere the user travels (e.g., the user is not limited by carrying a large, bulky and heavy device).

The portable electronic device 10 may be widely varied. In some embodiments, portable electronic device 10 may perform a single function (e.g., a device dedicated to playing and storing media) and, in other cases, the electronic device may perform multiple functions (e.g., a device that plays/stores media, receives/transmits telephone calls/text messages/internet, and/or performs web browsing). In some embodiments, the portable electronic device 10 is capable of communicating wirelessly (with or without the aid of a wireless enabling accessory system) and/or via wired pathways (e.g., using traditional electrical wires). In some embodiments, the portable electronic device 10 may be extremely portable (e.g., small form factor, thin, low profile, lightweight). In some cases, the portable electronic device 10 may be sized for being handheld. The portable electronic device 10 may even be sized for one-handed operation and placement into small areas such as a pocket, i.e., the portable electronic device 100 can be a handheld pocket sized electronic device.

By way of example, the portable electronic device 10 may correspond to consumer electronic products such as computers, media players, personal digital assistants (PDA), telecommunication devices (phone), personal e-mail or messaging devices and/or the like. In one example, the electronic device may correspond to any of those electronic devices an iPod™, an iPod Nano™, an iPod Shuffle™, an iPod™ Touch or an iPhone™ available by Apple Inc. of Cupertino, Calif.

The portable electronic device 10 includes a housing 100 configured to at least partially enclose any suitable number of components associated with the electronic portable electronic device 10. For example, the housing may enclose and support internally various electrical components (including integrated circuit chips and other circuitry) to provide computing operations for the device. The integrated circuit chips and other circuitry may include a microprocessor, memory, a battery, a circuit board, I/O, various input/output (I/O) support circuitry and the like. Although not shown in this figure, the housing 100 may define a cavity within which the components may be positioned and housing 100 also may physically support any suitable number of mechanisms, within housing 100 or within openings through the surface of housing 100.

In addition to the above, the housing may also define at least in part the outward appearance of portable electronic device 10. That is, the shape and form of the housing 100 may help define the overall shape and form of the portable electronic device 10 or the contour of the housing 100 may embody the outward physical appearance of the portable electronic device 10. Any suitable shape may be used. In some embodiments, the size and shape of the housing 100 may be dimensioned to fit comfortably within a user's hand. In some embodiments, the shape includes a slightly curved back surface and highly curved side surfaces. The shape will be described in greater detail below.

In one embodiment, the housing 100 is integrally formed in such as way as to constitute is a single complete unit. By being integrally formed, the housing 100 has a seamless appearance unlike conventional housings that include two parts that are fastened together thereby forming a reveal, a seam there between. That is, unlike conventional housings, the housing 100 does not include any breaks thereby making it stronger and more aesthetically pleasing.

The housing 100 can be formed of any number of materials including for example plastics, metals, ceramics and the like. In one embodiment, housing 100 can be formed of stainless steel in order to provide an aesthetic and appealing look and feel as well as provide structural integrity and support for all sub-assemblies installed therein. When metal, the housing 100 can be formed using conventional collapsible core metal forming techniques well known to those skilled in the art.

The portable electronic device 10 also includes a cover 106 that includes a planar outer surface. The outer surface may for example be flush with an edge of the housing wall that surrounds the edge of the cover. The cover 106 cooperates with the housing 100 to enclose the portable electronic device 10. Although the cover can be situated in a variety of ways relative to the housing, in the illustrated embodiment, the cover 106 is disposed within and proximate the mouth of the cavity of the housing 100. That is, the cover 106 fits into an opening 108. In an alternate embodiment, cover 106 may be opaque and may include touch sensing mechanism that forms a touch pad. Racetrack 122 is defined as the uppermost portion of the housing 100 that surrounds the polished top glass layer 106. In order to maintain the desired aesthetic look and feel of the portable electronic device 10, it is desirable that any offsets between the housing 100 and the polished top glass layer 106 be minimized and the racetrack 122 be centered.

The cover 106 may be configured to define/carry the user interface of the electronic device 10. The cover 106 may for example provide a viewing region for a display screen 104 used to display a graphical user interface (GUI) as well as other information to the user (e.g., text, objects, graphics).

The display screen 104 may be part of a display unit (not shown) that is assembled and contained within the housing 100. The display unit may for example be attached internally to a metal frame (e.g., 302). The cover may also provide a user clickable input button 114 (home button) that can be used to provide a user input event to the portable electronic device 10. Such user input events can be used for any number of purposes, such as resetting the portable electronic device 10, selecting between display screens presented on display screen 104, and so on. In one embodiment, the cover 106 is a protective top layer of transparent or semitransparent material (clear) such that the display screen 104 is visible therethrough. That is, the cover 106 serves as a window for the display screen 104 (i.e., the transparent cover overlays the display screen). In one particular embodiment, the cover is formed from glass (e.g., cover glass), and more particularly highly polished glass. It should be appreciated, however, that other transparent materials such as clear plastic may be used.

In one embodiment, the viewing region may be touch sensitive for receiving one or more touch inputs that help control various aspects of what is being displayed on the display screen. In some cases, the one or more inputs can be simultaneously received (e.g., multi-touch). In these embodiments, a touch sensing layer (not shown) can be located below the cover glass 106. The touch sensing layer may for example be disposed between the cover glass 106 and the display screen 104. In some cases, the touch sensing layer is applied to the display screen 104 while in other cases the touch sensing layer is applied to the cover glass 106. The touch sensing layer may for example be attached to the inner surface of the cover glass 106 (printed, deposited, laminated or otherwise bonded thereto). The touch sensing layer generally includes a plurality of sensors that are configured to activate as the finger touches the upper surface of the cover glass 106. In the simplest case, an electrical signal is produced each time the finger passes a sensor. The number of signals in a given time frame may indicate location, direction, speed and acceleration of the finger on the touch sensitive portion, i.e., the more signals, the more the user moved his or her finger. In most cases, the signals are monitored by an electronic interface that converts the number, combination and frequency of the signals into location, direction, speed and acceleration information. This information may then be used by the portable electronic device 10 to perform the desired control function relative to the display screen 104.

The portable electronic device 10 can also include one or more switches including power switches, volume control switches, user input devices and the like. A power switch 110 can be configured to turn the portable electronic device 10 on and off, whereas a volume switch 112 is configured to modify the volume level produced by the electronic portable electronic device 10. portable electronic device 10 portable electronic device 10 The portable electronic device 10 may also include one or more connectors for transferring data and/or power to and from the portable electronic device 10. The portable electronic device 10 may includes an audio jack 116 and a data/power connector 118. The audio jack 116 allows audio information to be outputted from the portable electronic device 10 by way of a wired connector. The connector 118 allows data to be transmitted and received to and from a host device such as a general purpose computer (e.g., desktop computer, portable computer). The connector 118 may be used to upload or down load audio, video and other image data as well as operating systems, applications and the like to and from the portable electronic device 10. For example, the connector 118 may be used to download songs and play lists, audio books, photos, and the like into the storage mechanism (memory) of the portable electronic device 10. The connector 118 also allows power to be delivered to the portable electronic device 10.

The connector 118 can receive an external corresponding connector (not shown) that is capable of plugging into a host device (and/or power supply) in order to allow communications (e.g., data/power transfer) between the portable electronic device 10 and the host device. The connector may be widely varied. In one embodiment, the connector is a peripheral bus connector, such as a USB or FIREWIRE connector. These type of connectors include both power and data functionality, thereby allowing both power delivery and data communications to occur between the portable electronic device 10 and the host device when the portable electronic device 10 is connected to the host device. In some cases, the host device can provide power to the media portable electronic device 10 that can be used to operate the portable electronic device 10 and/or charge a battery included therein concurrently with the operating. In one particular embodiment, the connector is a 30 pin connector as used in many products manufactured by Apple Inc of Cupertino, Calif. Audio jack 116 can receive an audio post (not shown) that can provide audio signals to external audio rendering devices, such as headphones, speakers, etc.

Although the device may connect through various wired connections, it should be appreciated that this is not a limitation. In one embodiment, the electronic portable electronic device 10 also includes a mechanism for wireless communications. For example, as shown, the portable electronic device 10 may include an antenna (i.e., antenna 222). The antenna may be disposed internal to the housing 100. The wireless communications can be based on many different wireless protocols including for example Bluetooth, RF, 802.11, and the like. In order to minimize any adverse impact on wireless communications in embodiments where the housing is metallic and therefore conductive, portable electronic device 10, a portion of the housing 100 may replaced with a radio transparent cap 120 formed of a non-conductive material, such as plastic.

FIG. 1C shows a cross sectional view of the housing 100 highlighting the nature of the undercut geometry. Although in general the inner cross sectional shape of the housing 100 may be the same or different from the external cross sectional shape of the housing 100, the interior shape of housing 100 substantially conforms to the outer shape of housing 100. The housing 100 can be formed having an undercut geometry with curvature that more easily receives the hand of a user (e.g., form fits). In particular, an interior wall of housing 100 substantially conforms to the shape of an exterior wall of housing 100. More specifically, side wall 121 (both interior and exterior) is rounded and curved inwardly to form a concave undercut region 123 formed at an upper portion of the side wall 121 in proximity to cut edge 128. By undercut it is meant that the side wall 121 curves back inwardly towards the interior of the housing 100. In this way, the window opening 108 has at least smaller X dimension and Y dimension than does the body of the housing 100. In one example, the housing 100 can have dimensions of approximately $(x,y)_{housing}=(61.8 \text{ mm}, 111 \text{ mm})$ whereas the opening 108 can have dimensions of approximately $(x,y)_{opening}=(58.3 \text{ mm}, 107.5 \text{ mm})$.

FIGS. 2A-2E show various exploded perspective diagrams of the electronic portable electronic device 10 in its unassembled form. The portable electronic device 10 includes housing 100 shown in FIG. 2A into which are attached a number of operational and/or structural components. Housing 100 can take the form of a seamless enclosure. The seamless nature of the housing 100 provides an aesthetic look and feel to the portable electronic device 10 as well as provides added resistance to deformation and possible damage to internal components caused by the impact of a drop event. In the embodiments described herein, housing 100 is formed of stainless steel and having thickness of approximately 0.5 mm. It should be noted, however, that this configuration is representative in nature only and does not provide limitations constraining the ultimate scope of the invention.

The housing 100 extends along a vertical (Y) axis and a horizontal (X) axis having a height Z. The housing 100 can be of various sizes. For example, the housing 100 can have a height (Z) of approximately 8.5 mm, an X dimension of approximately 61.8 mm and a Y dimension of approximately 111 mm. The housing 100 includes a cavity 124 which is sized and dimensioned for the receipt of the internal components of the portable electronic device 10. The internal components are assembled through window opening 108. The undercut geometry of the housing 100 provides that the linear dimensions of the window opening 108 into which the operational components are inserted during assembly are smaller than the linear dimensions of the body of the housing 100. For example, the window opening 108 can have an X dimension of approximately 58.3 mm and a Y dimension of approximately 107.5 mm.

Figure 3:
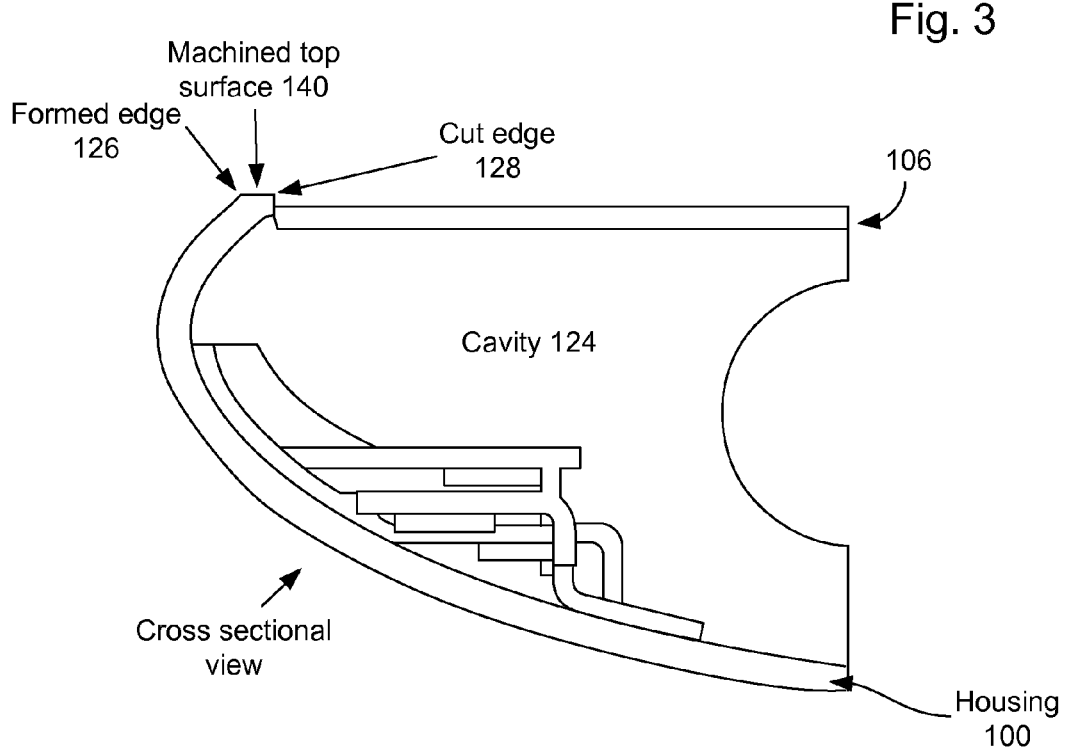
FIG. 3 are view diagrams of the housing showing the racetrack.
Figure 3:
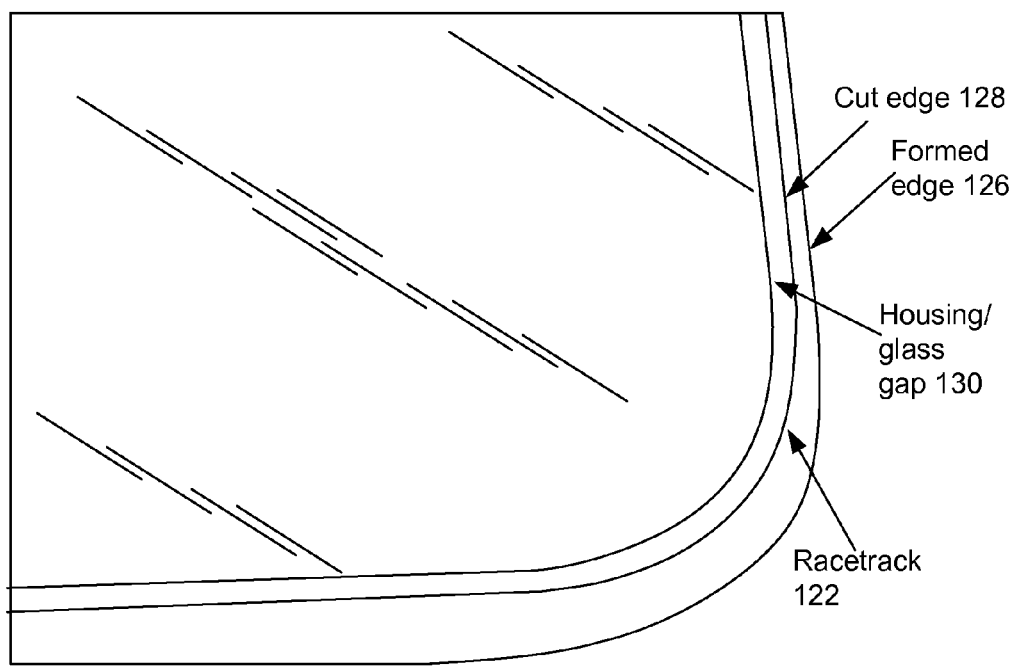

One aspect of the desired look and feel is the symmetry in design and conformal appearance of portable electronic device 10. One aspect of the symmetry of the portable electronic device 10 concerns the racetrack 122. The racetrack 122 is the strip of metal around the cover 106 on the front face of the device. The width of the racetrack 122 is defined by an outer racetrack profile and inner racetrack profile. Since the housing 100 is made from a sheet metal material, the outer racetrack profile is achieved by sheet metal forming while the inner racetrack profile is achieved by machining where the forming tolerance is much greater than machining tolerance. In the described embodiment, the outer racetrack profile is consistent with a formed edge 126 whereas the inner racetrack profile is consistent with and cut edge 128 of housing 100 as illustrated in FIG. 3 showing a representative cross section and top view of portable electronic device 10 highlighting the relationship of racetrack 122 and both the formed edge 126 and the cut edge 128.

Figure 4A:
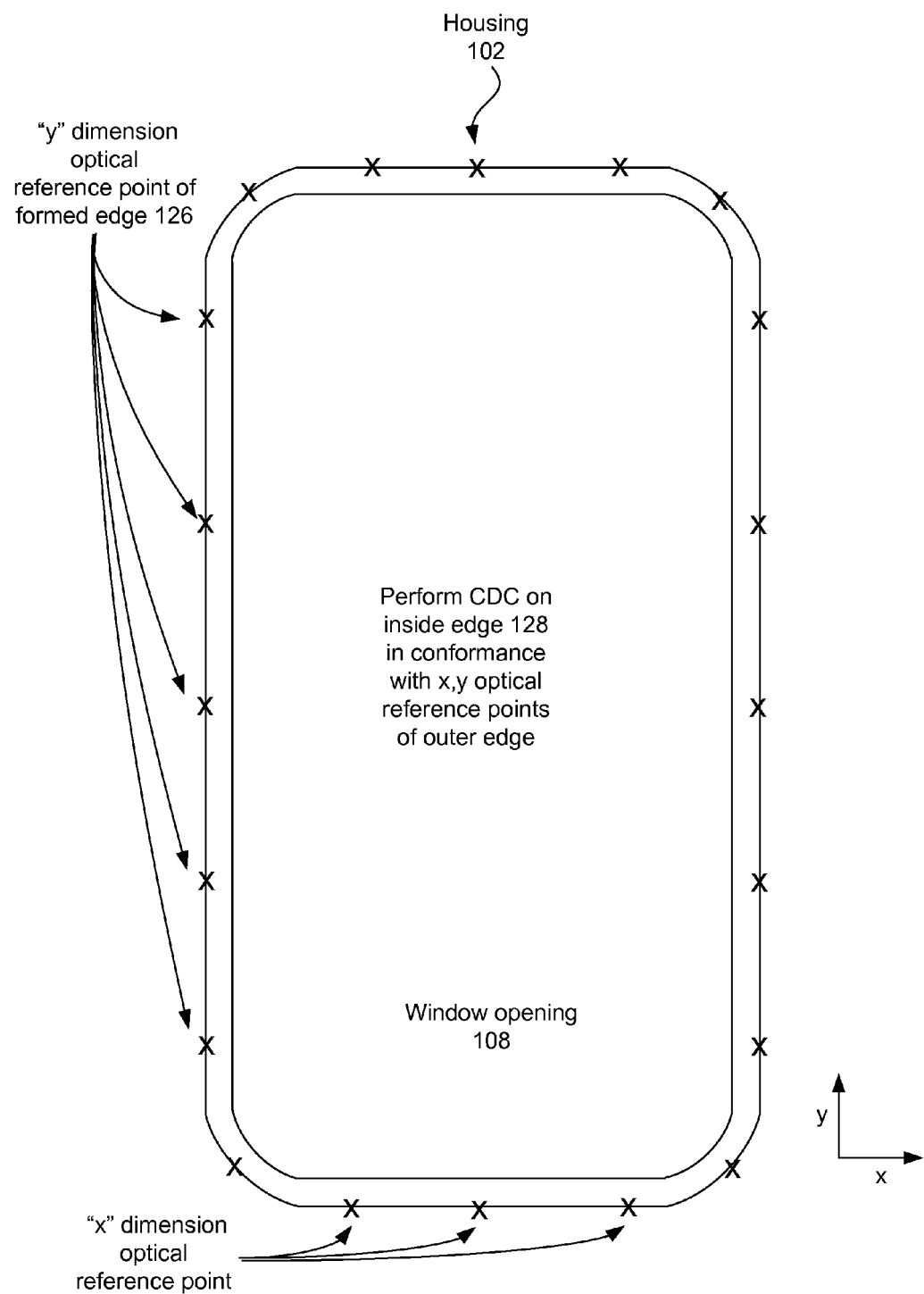
FIGS. 4A-4B graphically illustrate centering a racetrack in accordance with an embodiment of the invention.
Figure 4B:
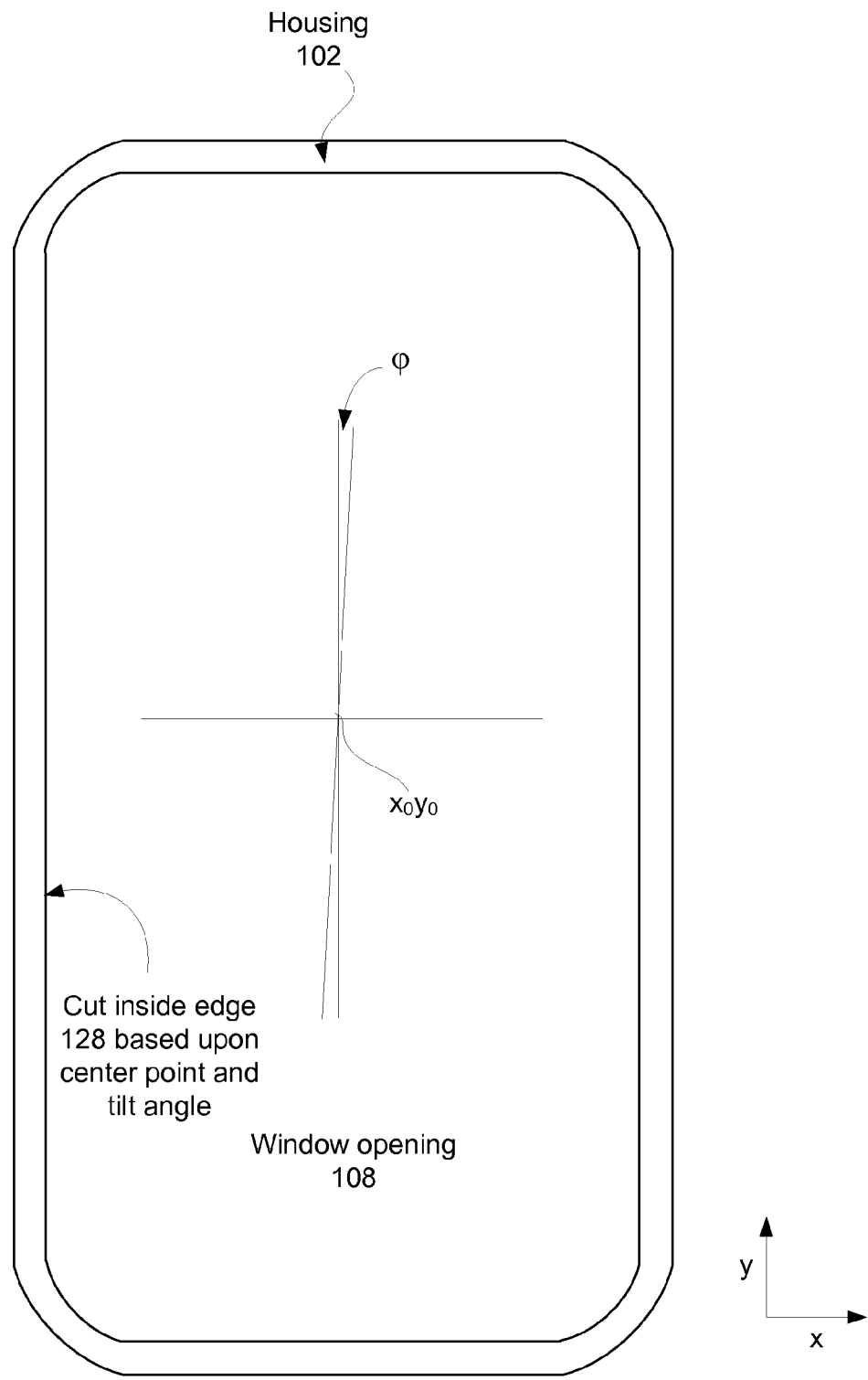

In order to maintain the desired appearance of portable electronic device 10 it may be desirable to properly center racetrack 122. This centering can however be accomplished in a number of ways depending upon what is considered to be an important factor in the overall aesthetics of the design of portable electronic device 10. In any case, a series of optical measurements are made using for example a CCD camera to measure the outside racetrack profile after a rough cut of same. Once the CCD measurements have been taken, any of a number of approaches can be used to center the racetrack 122. However, depending upon which approach is taken can result in somewhat different results. For example, as shown in FIG. 4A, centering the racetrack 122 using the outside racetrack profile (i.e., formed edge 126) will produce a consistent racetrack width, however, the gap 130 from the housing to glass will be less consistent. [gap 130 is not referenced] On the other hand, the racetrack 122 can also be centered by forming the inner racetrack profile shape by cutting the cut edge 128 per the 3D CAD, but use the CCD measurements to find the center $(x_0, y_0)$ and any rotation angle $\phi$ for cutting the inner profile as shown in FIG. 4B. This particular centering approach will give a less consistent racetrack width but a more consistent gap 130 from the housing to glass.

FIGS. 2B-2E illustrate the operational components of the portable electronic device 10. In the described embodiment, the components of the portable electronic device 10 are organized in layers. The relationship and organization of the components within each layer and relationship between layers can be used to facilitate both the assembly and optimization of Z height tolerances of the portable electronic device 10. By minimizing Z height tolerances, the electronic portable electronic device 10 is manufactured to be extremely compact, sturdy, aesthetically pleasing and ergonomic at relatively low cost. For example, the fact that the electronic portable electronic device 10 is assembled without the need of a bezel reduces manufacturing and assembly costs. The layers can include a first (main electronic) layer 200, a second (metal frame or M-frame) layer 300 and a third (glass or G unit) layer 400 each of which is described in more detail below.

Figure 2A:
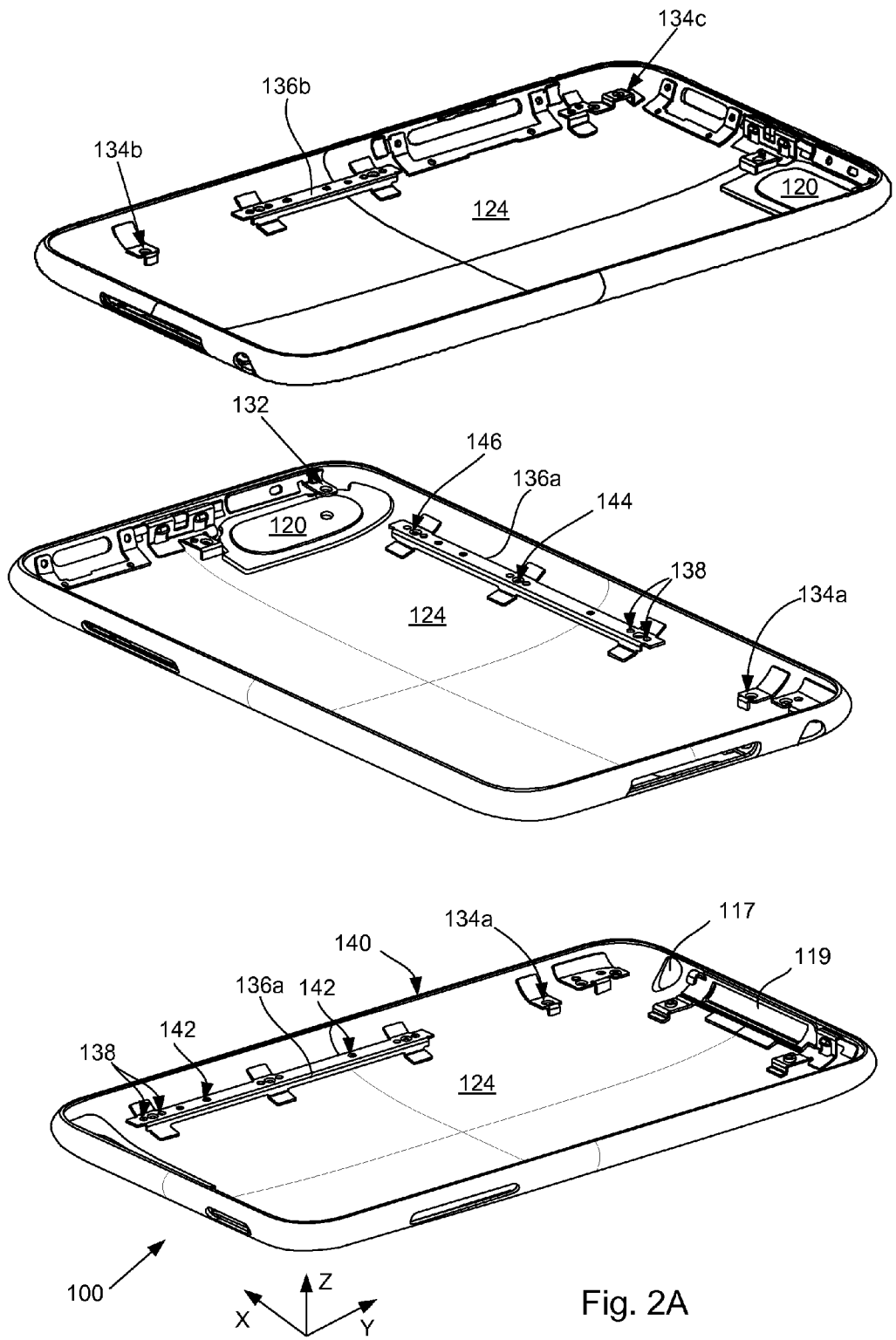
Figure 2B:
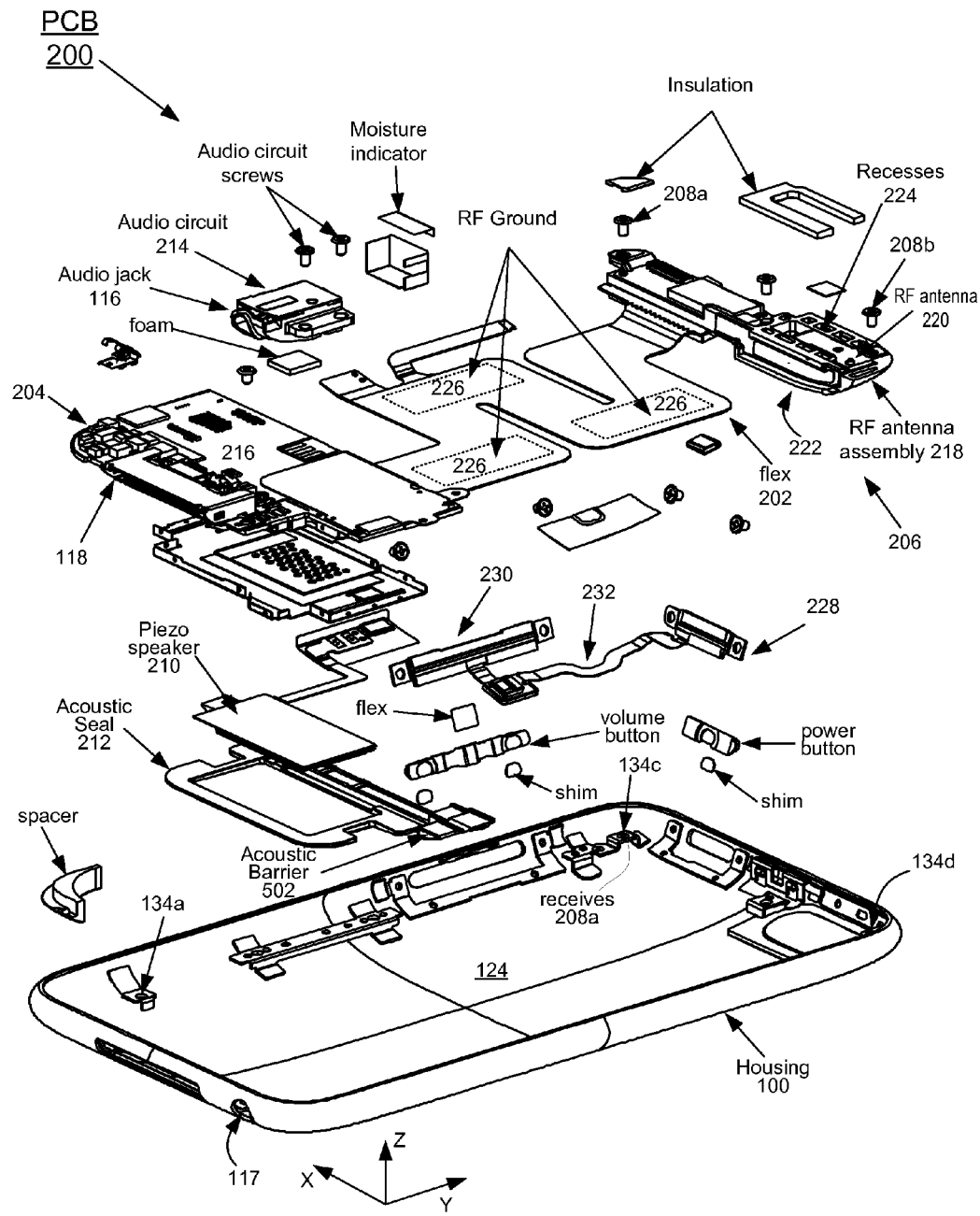

FIG. 2B shows a detailed view of the first layer 200 (referred to hereinafter as PCB layer 200) in accordance with an embodiment of the invention.

The PCB layer 200 includes a first assembly 204 and a second assembly 206, which are physically and operatively connected via a flex circuit 202. The first assembly 204 includes a printed circuit board (PCB) 205 onto which the flex circuit 202 is attached. The printed circuit board 205 is configured to carry multiple components including for example processor, memory and the like. The printed circuit board 205 is also configured to carry an RF shield 207 that is disposed over the various components. RF shield 207 is formed from metal and configured to cover and surround the components. The first assembly also includes a speaker system 209 that is not a separate discrete system but rather a system that integrates with other components in order to properly output sound. At its core, the speaker system includes a piezo speaker 210, acoustic seal 212 and acoustic barrier. The piezo speaker 210 is attached to the RF shield 207, the acoustic seal 212 closes off gaps in order to form an acoustic volume between RF shield and housing. This embodiment will be described greater detail in FIGS. 5A-5C. The printed circuit board 205 is also configured to carry the connector 118 and the audio jack assembly 116. In the described embodiment, the audio jack 116 fits into audio jack opening 117 and acts as an interface to an external circuit (such as head or earphones) by way of a wire or other type connector. For proper fit of the audio jack 116 into the audio jack opening 117, the audio jack opening 117 must have a shape that conforms to both the spline of the housing 100 as well as the shape of the audio jack 116 described in more detail in FIGS. 6A-6B.

The PCB layer 200 can be fitted into cavity 124 of housing 100 and secured to an interior wall of the housing 100 using fasteners such as screws 208a and 208b that connect directly to housing 100 (it should be noted that screw 208b also facilitates RF antenna grounding discussed in more detail below). It should be noted that prior to assembly, the power button 110 is attached to the housing using a power button plate 228 and the volume button 112 is attached to the housing 110 using a volume button plate 230 each of which are electrically connected to each other by way of flex 232.

One of the problems with having an active RF antenna assembly in a close proximity to a number of active circuits is the generation of electromagnetic interference (EMI) that can detune or otherwise adversely affect the performance of the RF antenna 222. For example, the relatively long conductors present in the flex 202 can act as a source of EMI that can detrimentally affect the performance of RF antenna 222. In order to substantially reduce or even eliminate this source of EMI it would be desirable to RF ground the PCB 200. Therefore, in order to provide a good RF ground, portions 226 of the insulating layer of flex 202 facing the inside surface of housing 100 are removed in order to expose the conductive layer therein. The portions 226 of the flex 202 that are removed typically are those regions that are relatively large and contiguous thereby having the greatest potential to provide good RF grounding when placed in contact with the metal of housing 100. In the described embodiment, after the portions 226 of the flex 202 have been removed, the exposed conductive material is pressed down onto the housing 100. The presence of pressure sensitive conductive adhesive (PSCA) placed between flex 202 and housing 100 provides the requisite mechanical and electrically conductive bond. In addition to providing good RF grounding, the conformance of the flex 202 to the inside surface of housing 100 reduces the overall Z profile of the PCB 200.

FIGS. 2C and 2D show a un-assembled top view and an assembled bottom view of third layer 300 referred to hereinafter as metal (M) frame assembly 300, respectively, in accordance with an embodiment of the invention. Turning first to FIG. 2C, M-frame assembly 300 can include M-frame 302, battery 304 attached to the M-frame 302 by way of pressure sensitive adhesive (PSA) and display circuit 306 that includes display 104. In the described embodiment, Z height requirements for the M-frame 300 can be reduced by using what is referred to as half shears 310. Half shears 310 can be formed by removing portions of the M-frame 302 in those locations around screw holes in M-frame 300 used to accommodate screws 312a and 312b that attach M-frame 302 to housing 100. In the described embodiment, a sufficient amount of material is removed from M-frame 302 such that a top portion of each of the screws 312a and 312b are essentially flush with a top surface 314 of the M-frame 302. As described in more detail below, each half shear 310 is aligned with a Z height datum bump described in more detail below thereby further minimizing Z height requirements for portable electronic device 10. Moreover, display unit alignment holes 316 are provided to accept alignment pins (not shown) on display unit 306 that provide x,y alignment to the housing 100 by way of alignment holes 140 in mounting brackets 136a and 136b.

In addition to minimizing Z height requirements, the overall Y component of battery circuits and display circuits can be reduced as shown in FIG. 2D that graphically illustrates the organization of circuits associated with the battery 304 and display circuit 306. In particular, battery circuitry 318 and display circuitry 320 co-exist in the same Y location thereby reducing the overall Y component of the circuits. In the described embodiments, the battery circuitry 318 can take the form of a battery safety circuit 318 and the display circuitry can include a LCD controller 320. Conventional designs dictate that the battery safety circuit 318 be placed in a central portion of the battery 304 and that the LCD controller 320 should not be aligned to a far edge of the display circuit 306 (as this would likely increase line width and parasitic capacitance reducing the available drive of the LCD controller). However, by modifying the design of both battery safety circuit 318 and LCD controller 320, the two circuits can be placed at the same Y location. In this way, the overall Y component of the two circuits taken together can be reduced. Furthermore, in order to conform to the spline of the housing 100 and to reduce the overall Z of the portable electronic device 10, the LCD controller flex 322 is wrapped around and placed under the battery 304 in order for display connector 324 and battery connector 326 to mate as shown in FIG. 2D.

Figure 2E:
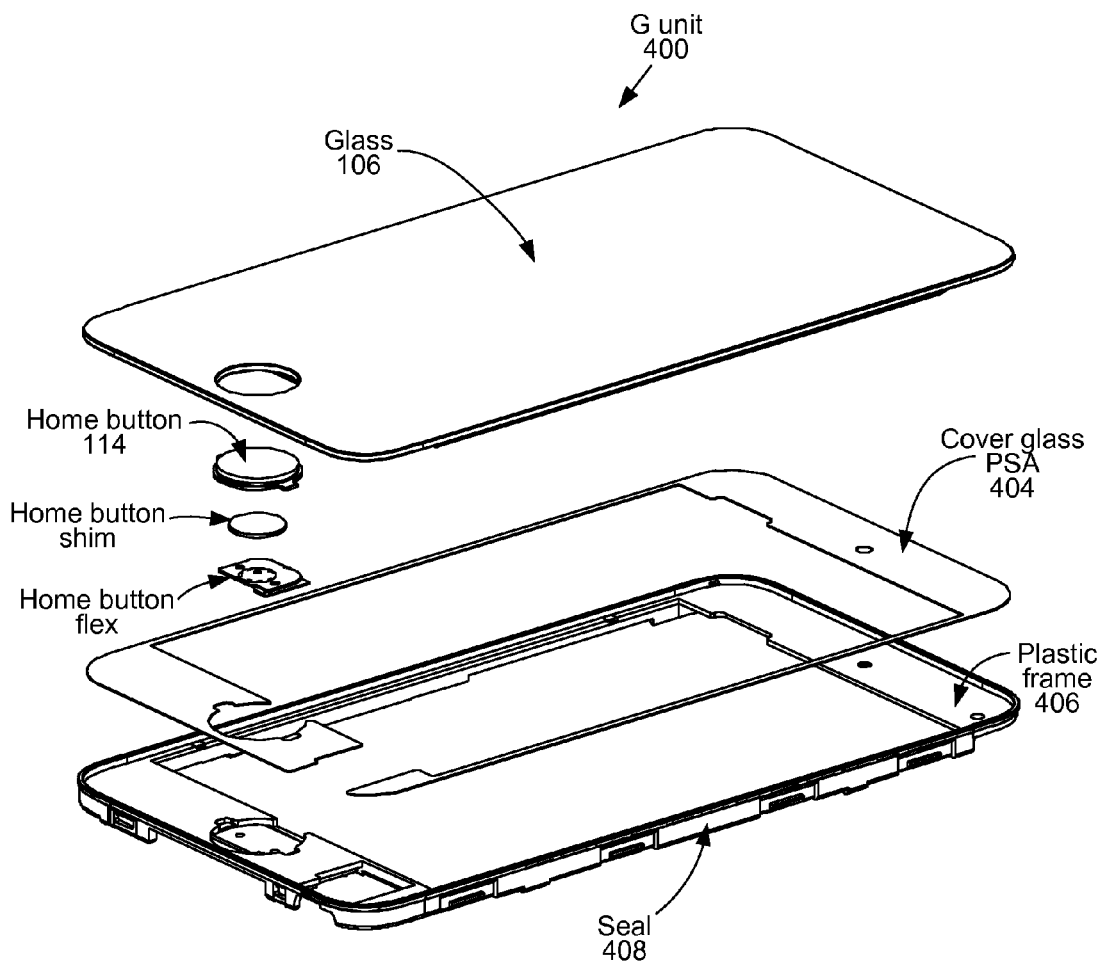
Figure 8A:
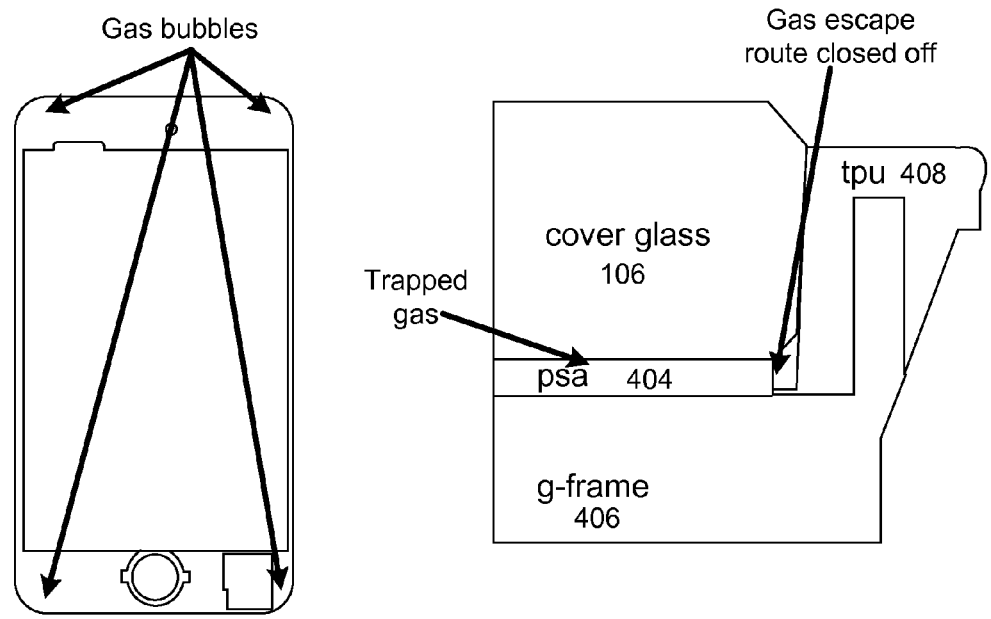
FIGS. 8A-8B show gas relief structures in accordance with an embodiment of the invention.
Figure 8B:
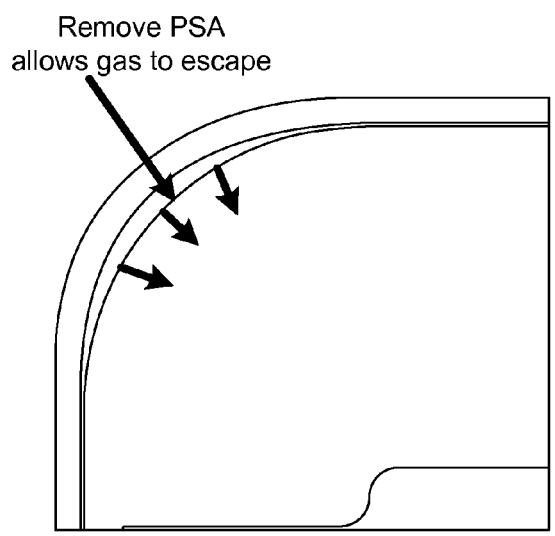
Figure 8B:
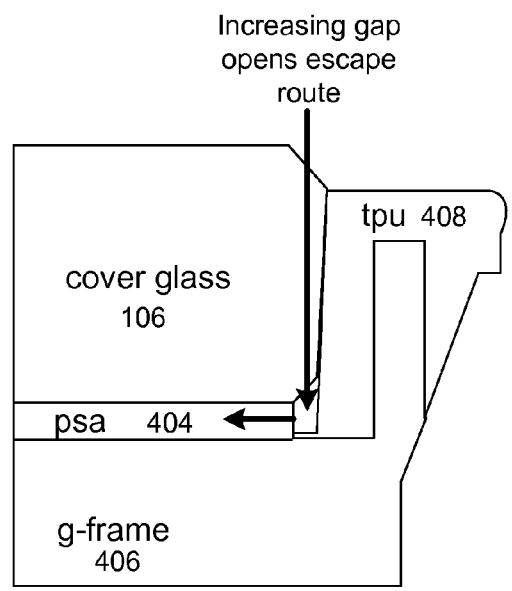

Portable electronic device 10 includes glass, or G, unit 400 shown in FIG. 2E. G unit 400 includes cover glass 106. G unit 400 also includes cover glass PSA 404 used to adhere cover glass 106 plastic frame 406. Environmental seal 408 can be used to prevent dust or other unwanted environmental contaminants from entering the portable electronic device 10 after assembly. During assembly, G unit 400 can be placed within window 108 of housing 100 on top of the M-frame assembly 300 as shown in FIGS. 8A-8C. The G unit 400 self aligns during the insertion process and secured to M frame 302 using M-frame lead in 324. G unit 400 includes a double shot arrangement formed of plastic frame 406 and an environmental, or cosmetic, seal 408 made of, for example, thermoplastic urethane (TPU), rubber, and the like that can act to protect portable electronic device 10 from dust and or moisture. As described below, the shape of environmental seal 408 in relation to housing 100 aids in self aligning G unit 400 to window 108 opening during assembly. During the assembly process as shown in FIG. 8A, the G unit 400 is inserted into window opening 108 by bringing plastic frame 406 into contact with M-frame lead in 324. In the described embodiment, both the environmental seal 408 and the M-frame lead in 324 have corresponding tapered shapes that provide for the G unit 400 to self align. For example, in FIG. 8B, as the G unit 400 is being inserted into the window opening 108, the plastic frame 406 encounters the tapered shape of the M-frame lead in 324. The M-frame lead in 324 has the effect of both aligning and securing the G unit 400 until such time as shown in FIG. 8C that the tapered edge of the environment seal 408 encounters the inside, or cut edge, 128 of the housing 100. A portion 410 of the environmental seal 408 extends beyond the cut edge 128. In the described embodiment, the portion 410 has a tapered edge that causes the G unit 400 to self center to the window opening 108 as shown in FIG. 8C until the G unit 400 is captured by M-frame lead in 324.

During assembly, when pressure is applied to G unit 400, trapped gases coalesce into gas bubbles having the result of minimizing the bond area between the pressure sensitive adhesive (PSA) and the glass 106. The gas become trapped due in part to the fact that due to assembly tolerances, the PSA would touch the seal 402 closing off a gas escape route (see FIG. 9A). Therefore, it would be advantageous to provide gas relief structures or assembly techniques on plastic frame 406 thereby enhancing the adhesion of glass layer 106 to plastic frame 406. Gas relief techniques can include removing predetermined sections of plastic frame 404 in appropriate locations by for example punching holes of a predetermined size and location or by removing small amounts of PSA from corners of the portable electronic device 10 allows trapped gas to escape more easily as shown in FIG. 9B. In this way, a more uniform distribution of adhesive resulting in a stronger and more reliable bond between glass layer 106 and plastic frame 404 can be achieved.

Figure 5A:
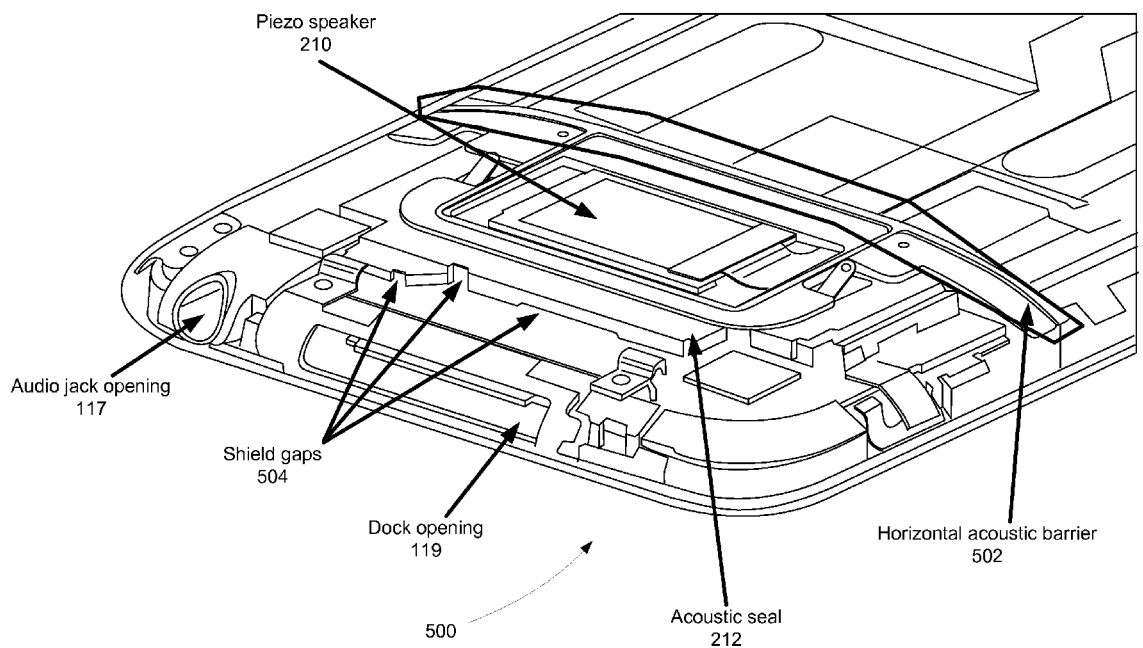
FIGS. 5A-5C show low Z height integrated speaker system suitable for use in a small form factor electronic device.
Figure 5B:
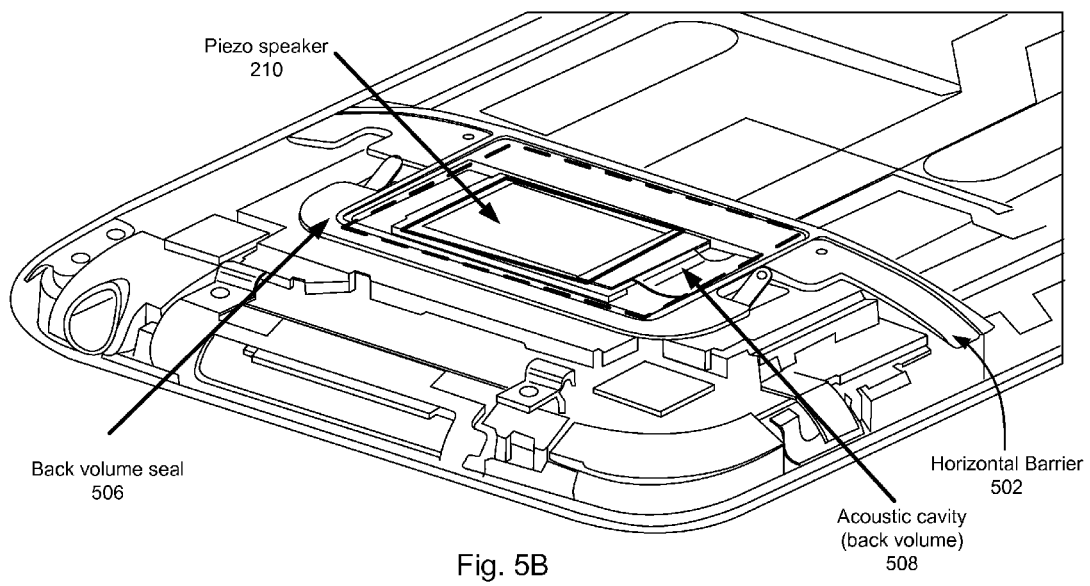

FIG. 5A shows an integrated, or minimum Z height speaker assembly 500 which is a particular embodiment of the integrated speaker assembly shown in FIG. 2B. The minimum Z height speaker assembly 500 includes at least a piezoelectric speaker 210 in combination with acoustic seal 212 and a horizontal (Y) acoustic barrier 502. Gaps 504 in the acoustic seal have the effect of directing the sound produced by the piezoelectric speaker 210 to any desired location in the housing 100. For example, the sound can be directed to specific openings in the housing 100 otherwise unrelated to the broadcasting of sound. Such openings can include for example dock opening 119 and/or an audio jack opening 117. The horizontal acoustic barrier 502 ensures that substantially no sound leaks to undesired portions of the housing 100 such as gaps associated with the volume button 112, power button 110, or the antenna cap 120. Furthermore, as shown in FIG. 5B, a back volume seal 506 can form an acoustic cavity 508, also referred to as a back volume, in cooperation with the housing 100. In this way, by using existing components, Z height requirements for creating the back volume 508 are reduced and a backside portion of the housing 100 can act as a resonator arranged to enhance the audio experience of a user. Since the back volume 508 is created using existing components (i.e., housing 100 and acoustic barrier 502), there is no adverse impact on the overall Z height of the portable electronic device 10.

Figure 5C:
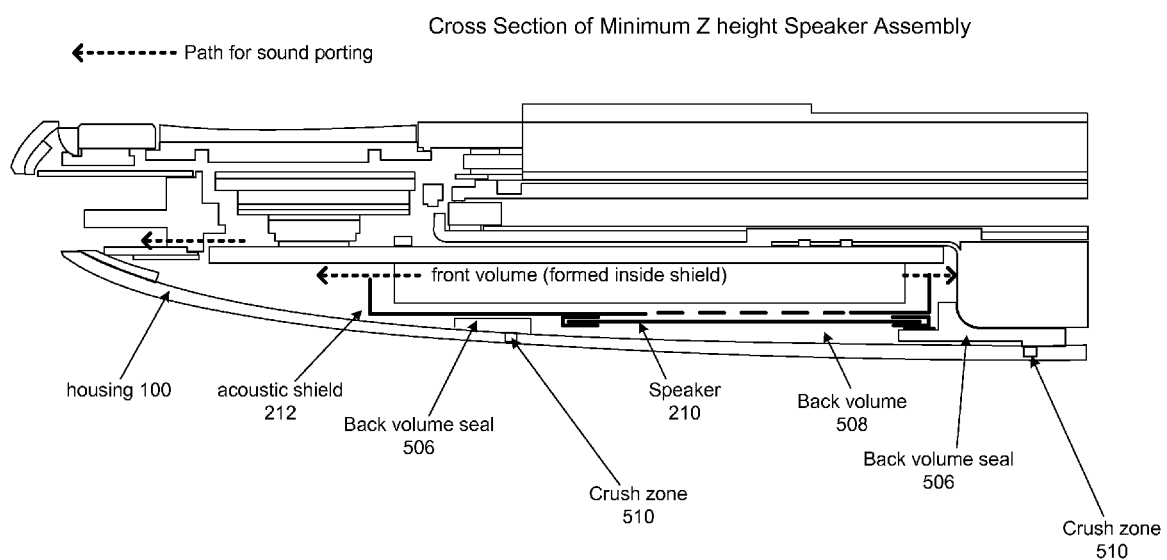

FIG. 5C shows selected crush zones 510 that are provide for adjustments for variations in Z tolerances and assure the integrity of the back volume 508. During assembly of portable electronic device 10, pressure can be exerted onto PCB 200 that has the effect of compressing, or crushing, crush zones 510. In this way, any variations in Z height of the various components of PCB 200 can be accommodated without comprising the integrity of the back volume 508. It should be noted that crush zones 510 can take on any of a number of shapes and sizes and be formed of any resilient material able to form a seal between the housing 100 and the back volume seal 506.

Figure 6A:
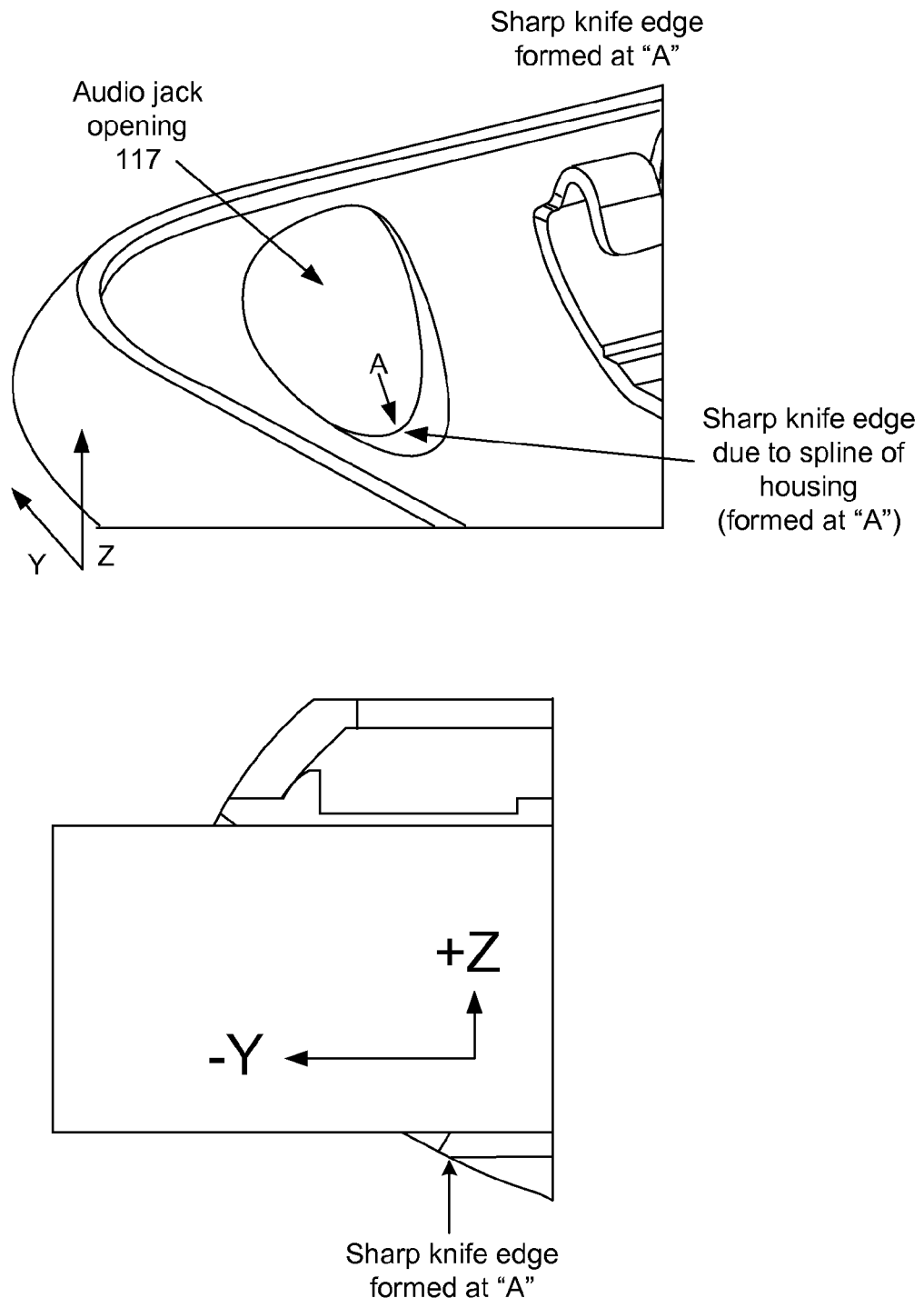
FIGS. 6A-6B show audio jack opening in accordance with an embodiment of the invention.
Figure 6B:
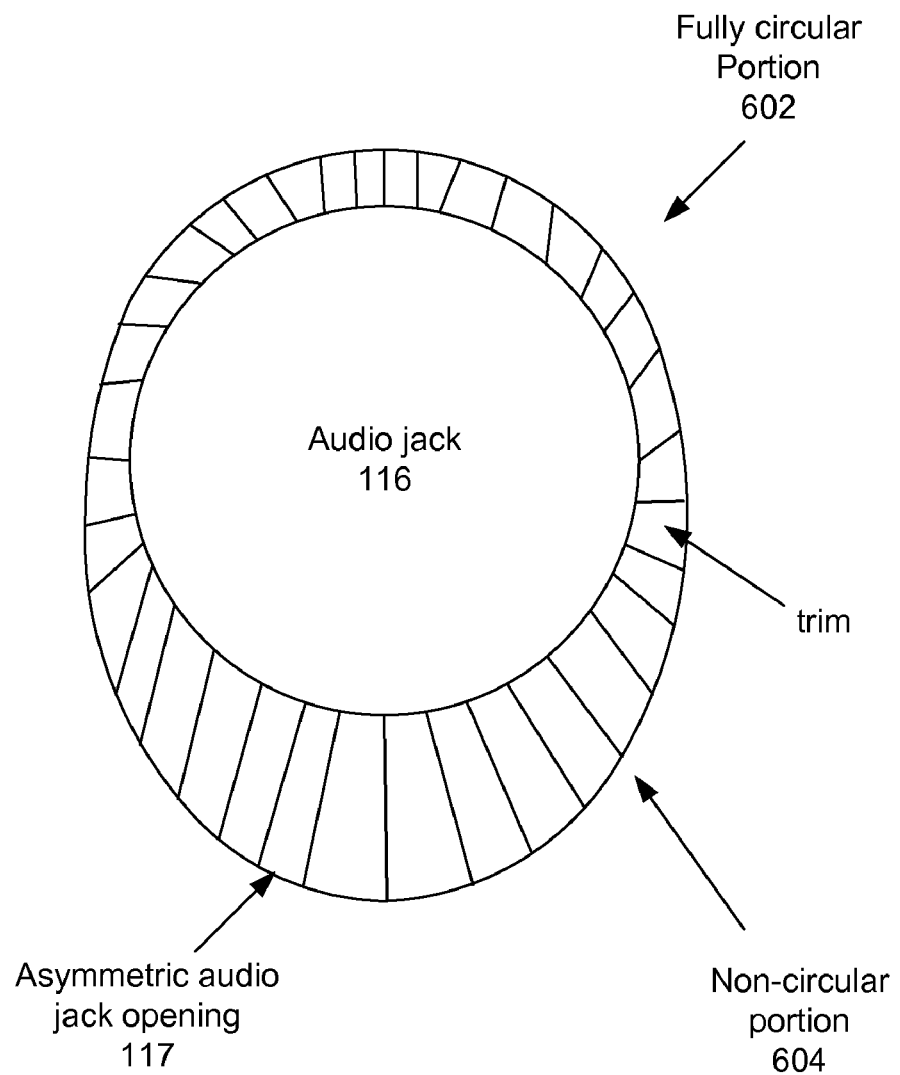
Figure 7A:
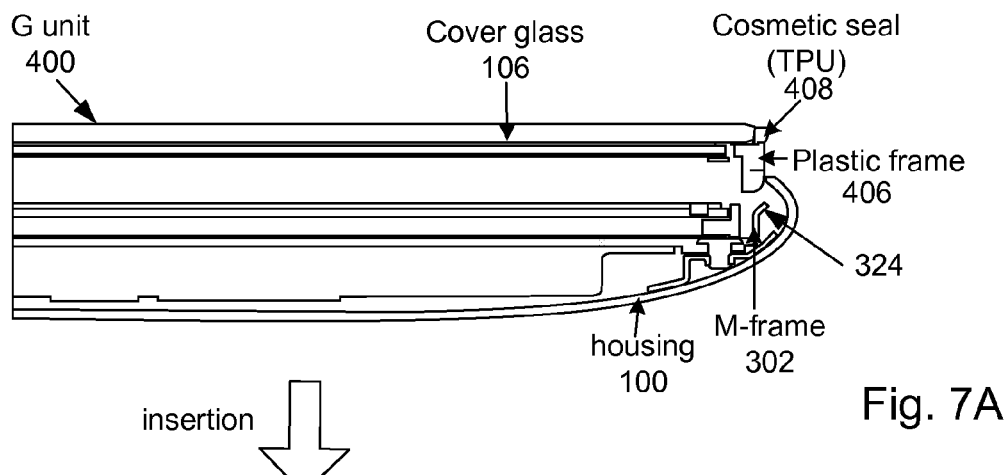
FIGS. 7A-7C show assembly of G unit in accordance with an embodiment of the invention.
Figure 7B:
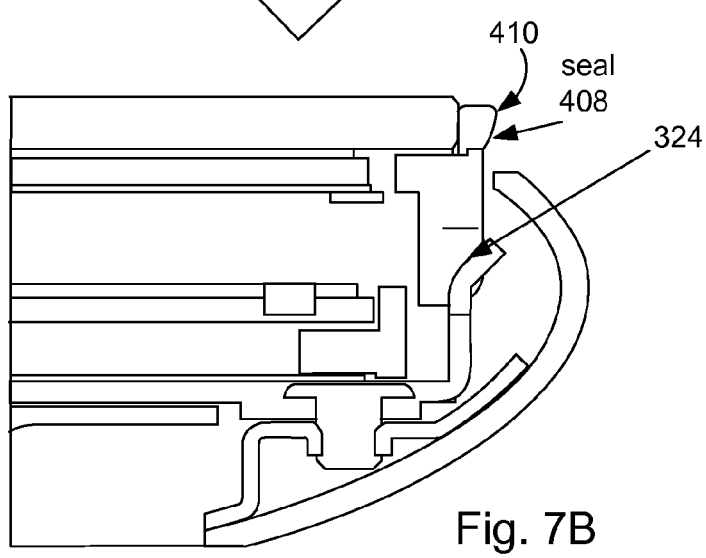
Figure 7C:
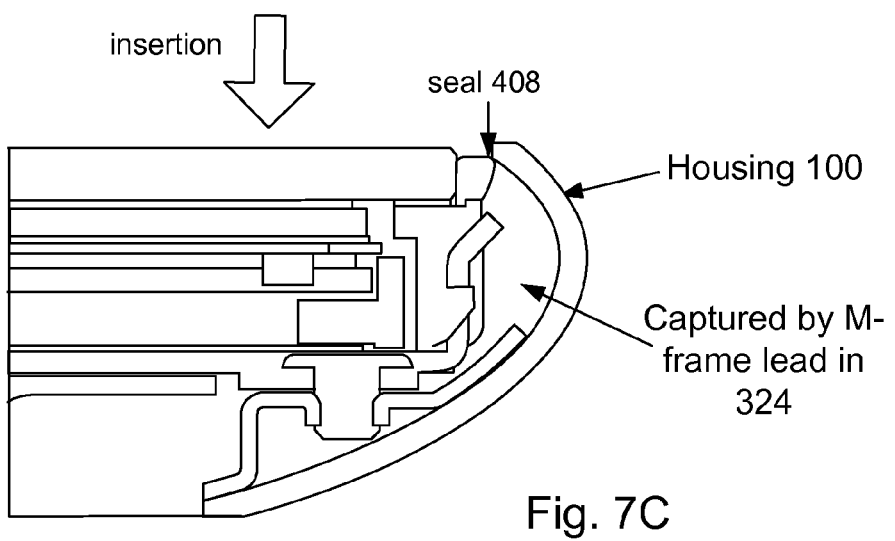

As shown in FIG. 6A, one of the problems with the asymmetric geometry of the housing 100 is that as the bottom cut surface (point "A") of audio jack opening 117 moves up in the positive Z direction, the edge of the cut moves in a negative Y direction due to the high curvature of the housing 100. In other words, a small change in the positive Z direction results in a large change in the negative Y direction. Since the audio jack 116 is fixed in the Z direction, the size of the audio jack opening 117 must not come so close to the upper portion of the housing 100 so as to present a risk to the cover glass 106 as would be the case if the audio jack opening 117 were formed too far into the shallower portion of the housing 100. In any case, having a fully circular portion in the shallower geometry of the housing 100 can result in very sharp edges (as shown in FIG. 6A) that must be machined down. Conventional machining processes, however, would cause the housing 100 in that region to become unacceptably thin presenting a risk of damage in an impact event. Therefore, in order to accommodate the circular shape of audio jack 116, the spline of housing 100, as well as to decrease the audio jack trim (the material around the audio jock structure itself) as little as possible, an non-symmetric audio jack opening 117 is formed as shown in FIG. 6B having circular portion 602 and a non circular portion 604 providing the non-symmetric shape for audio jack opening 117. In this way, the audio jack opening 117 provides that the audio jack 116 and the audio jack opening maintains a centered and circular appearance especially when viewed from above. It should be noted that it has been discovered that subsequent to the forming of the audio jack opening 117 in this manner, a deburring process for touch up can be performed using materials considered unconventional in the art of deburring. Such materials can include, for example, a bamboo wooden stick, wooden chopsticks, and the like.

Figure 9:
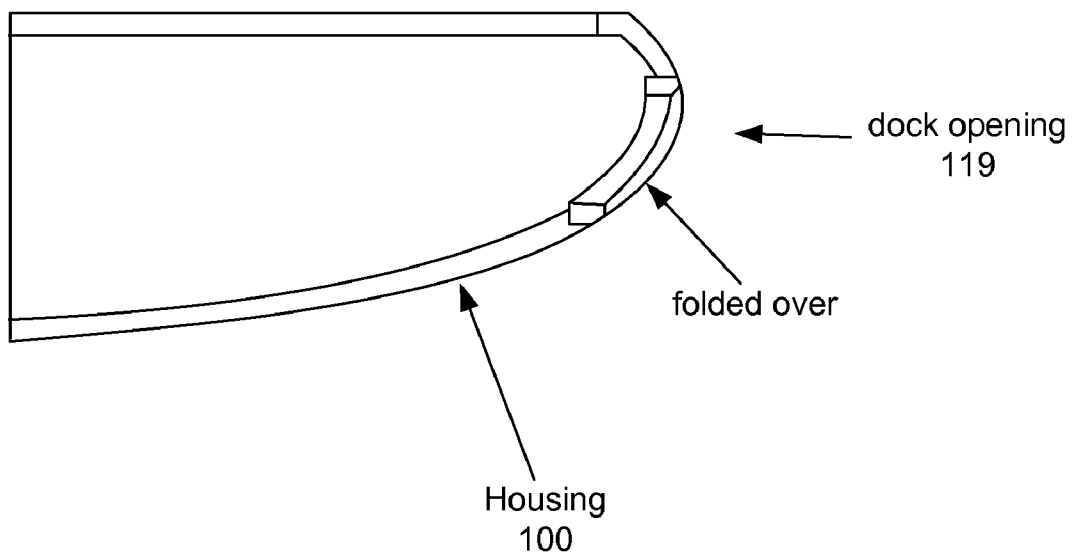
FIG. 9 shows a representative cross sectional view of the housing where the dock opening formed by folding over a portion of the housing in accordance with an embodiment of the invention.

In order to accommodate various interfaces (dock, audio jack, volume, power, for example), openings of various sizes must be created in the housing 100. There are a number of approaches that can be used to create these openings and make the opening trim appear to be thicker than the thickness (0.5 mm) of the sheet metal used to create the housing 100. One approach relies upon drawing or folding the sheet metal that forms the housing 100 as shown in FIG. 9. In any case, creating these openings in the housing 100 can result in long and thin webs of metal that can deform from the impact of a drop event, for example. In order to reinforce these areas, any of a number of different techniques can be used to add an additional layer of material (referred to as child material) to the parent material, which in this case is stainless steel having an approximate thickness of 0.5 mm. In some embodiments, the child material can be bonded to the parent material by welding, soldering, brazing or gluing. Once the child material is bonded to the parent material, a one stage cut is performed (machine or laser cut or punch, for example) in order to create the actual hole geometry.

Figure 10A:
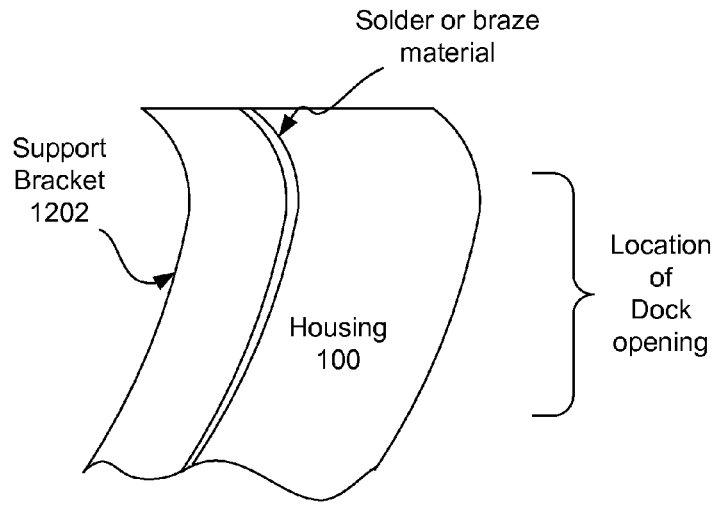
FIGS. 10A-10B shows a representative cross sectional view of the housing where the dock opening is to be created by way of a punching/forming/machining process.
Figure 10B:
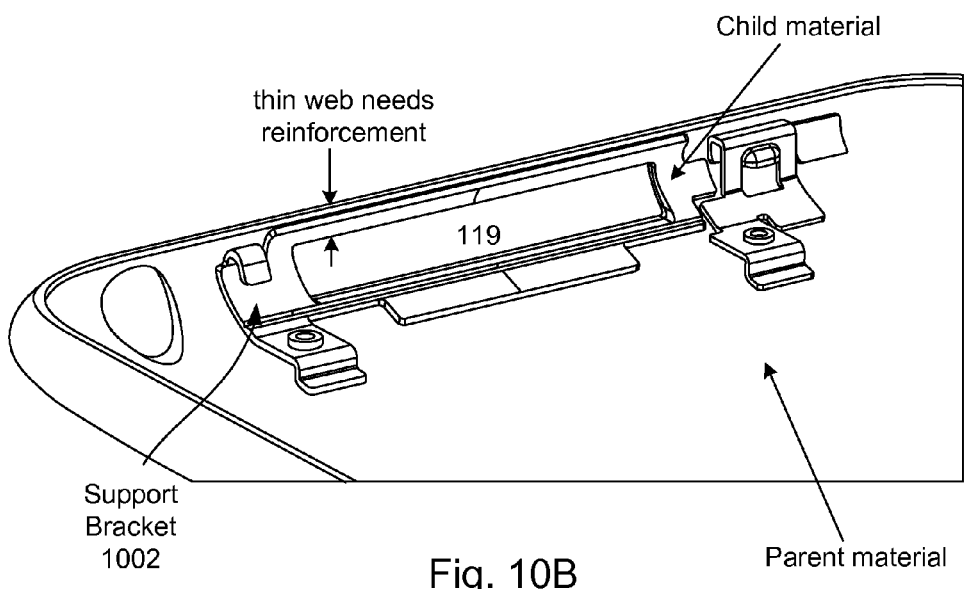

FIGS. 10A-10B shows a representative cross sectional view of the housing 100 in the area of the dock opening 119. However, due to the thickness (approximately 0.5 mm), the material (stainless steel) from which the described housing is formed, and the geometry (i.e., deep spline) of the housing 100 obtaining the desired deep cut is difficult to achieve in a large scale manufacturing environment. In particular, looking at FIG. 10A, due to the geometry of the housing 100 using a conventional punching operation to create the dock opening 119 would result in unacceptable asymmetric cut between the steep spline of the top portion and shallower spline of the lower portion of housing 100. Therefore as illustrated in FIG. 10A, a metal support bracket 1002 having a thickness approximately that of the housing 100 (which in this embodiment is approximately 0.5 mm) can be attached to the inside wall of housing 100 using solder or braze material or glued. By using solder or braze material or glue, the support bracket 1002 can be securely attached to the housing 100 as well as provides a good cosmetic result since the solder or braze material obscures the gap between the housing 100 and support bracket 1002. FIG. 10B shows a result of the punching operation to form the dock opening 119. By using the support bracket 1002, a double wall is formed in the area of the housing 100 in which the dock opening 119 (or any opening in housing 100 for that matter). In the described embodiment, since any gaps between support bracket 1002 and housing 100 are filled with solder or braze, both the desired cosmetic appearance and the desired structural integrity and strength can be maintained. It should be noted that in order to provide optimal strength for holes having large spans (volume button opening), the respective support brackets are positioned such that the presumptive hole is positioned approximately midway of the support bracket.

Figure 11A:
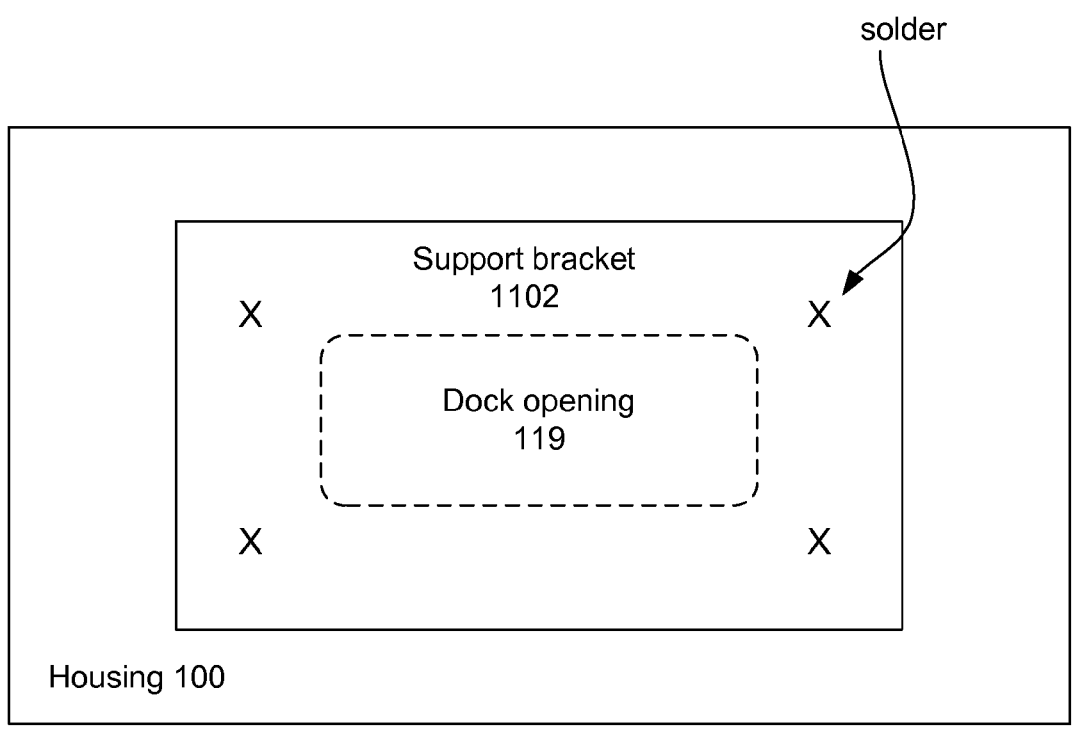

FIGS. 11A-11C graphically illustrate the process for forming the dock opening. FIG. 11A illustrates the placement of support bracket 1002 on housing 100 in relation to proposed dock opening 117. The support bracket 1002 can be welded to housing 100. FIG. 11B shows in profile view juxtaposition of support bracket 1002 and proposed dock opening. In this case, the support bracket 1002 covers the entire area of the proposed dock opening in order to provide maximum support post CNC. Accordingly, FIG. 11C shows in profile the post punching operation and CNC of dock opening 119, the support bracket 1002 having an upper portion 1102 and a lower portion 1104. It should be noted that in order to cosmetically hide the gap between the support bracket and housing 100, solder or braze material can be used to fill any gaps post CNC.

Figure 12A:
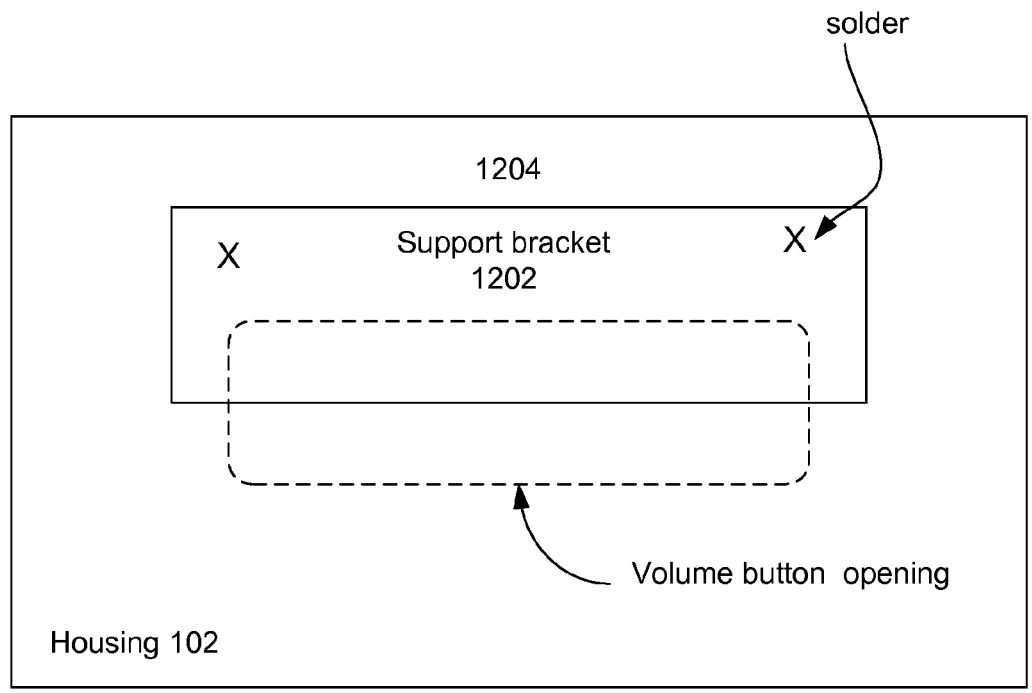
FIGS. 12A-12C graphically illustrate the process for forming a long span opening in the housing.
Figure 12B:
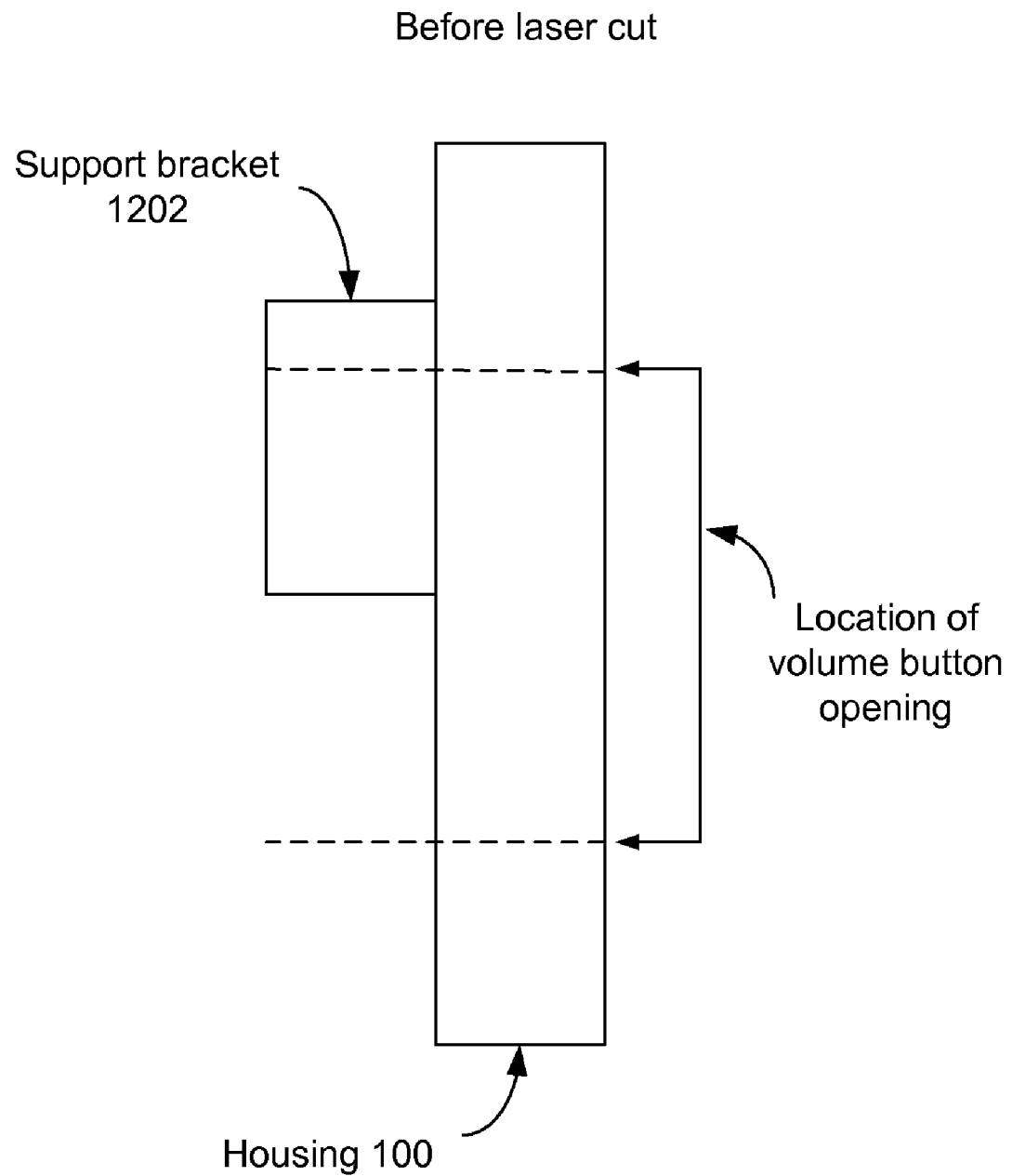
Figure 12C:
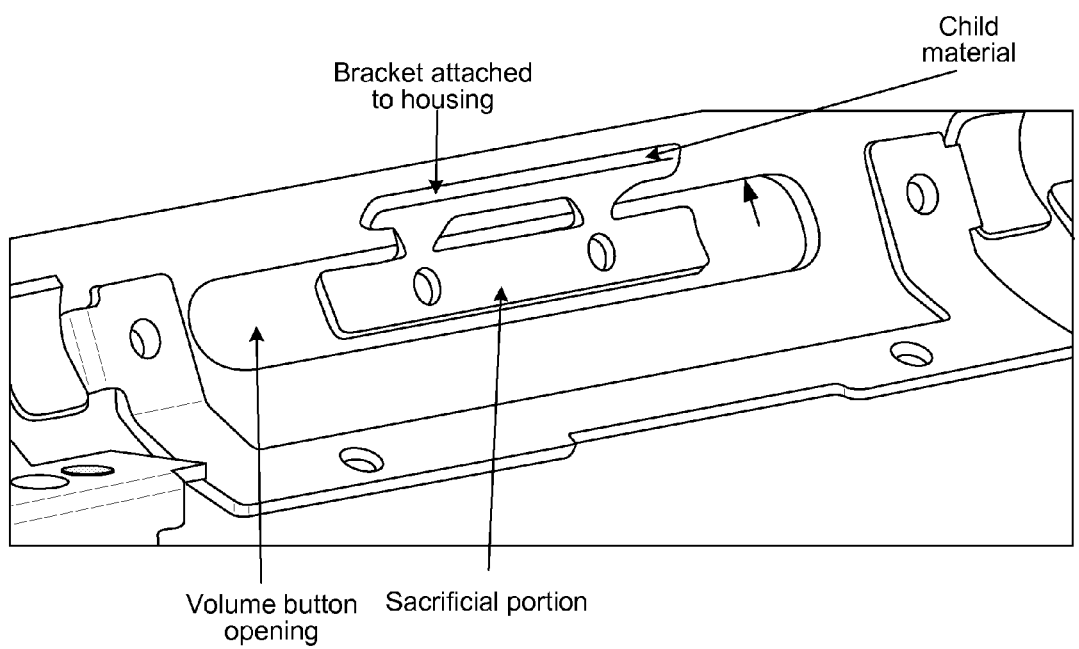

In the case of openings having long spans, such as the volume control button, FIGS. 12A-12C graphically illustrate the process for forming a long span opening such as the volume button opening. FIG. 12A illustrates the placement of support bracket 1202 on housing 100 in relation to proposed volume button opening. It should be noted that in this case, the support bracket 1202 only extends approximately midway in the y direction since the primary area requiring support is that thin strip 1204 above the proposed volume control button. The thin strip 1204 is susceptible to deformation during an impact event. FIG. 12B shows a profile view of the juxtaposition of the support bracket 1202, the housing 100, and the proposed location of the volume control button. FIG. 12C shows the post laser cut of the volume control button illustrating the upper support bracket providing the requisite support for any long span openings in housing 100 such as volume button.

It should be noted, however, that the above procedures are predicated on materials, such as stainless steel, and geometries (i.e., those have steep splines) that are not conducive to providing symmetric cuts or the proper depth of cut in a punching type operation. However, it is contemplated that using material other than stainless steel, such as aluminum, can provide the requisite symmetry. In these cases, a one piece punch and CNC can be used. It should further be noted that the thickness of the support brackets can be varied but it is found that having a thickness approximate to that of the housing 100 works well.

Figure 13:
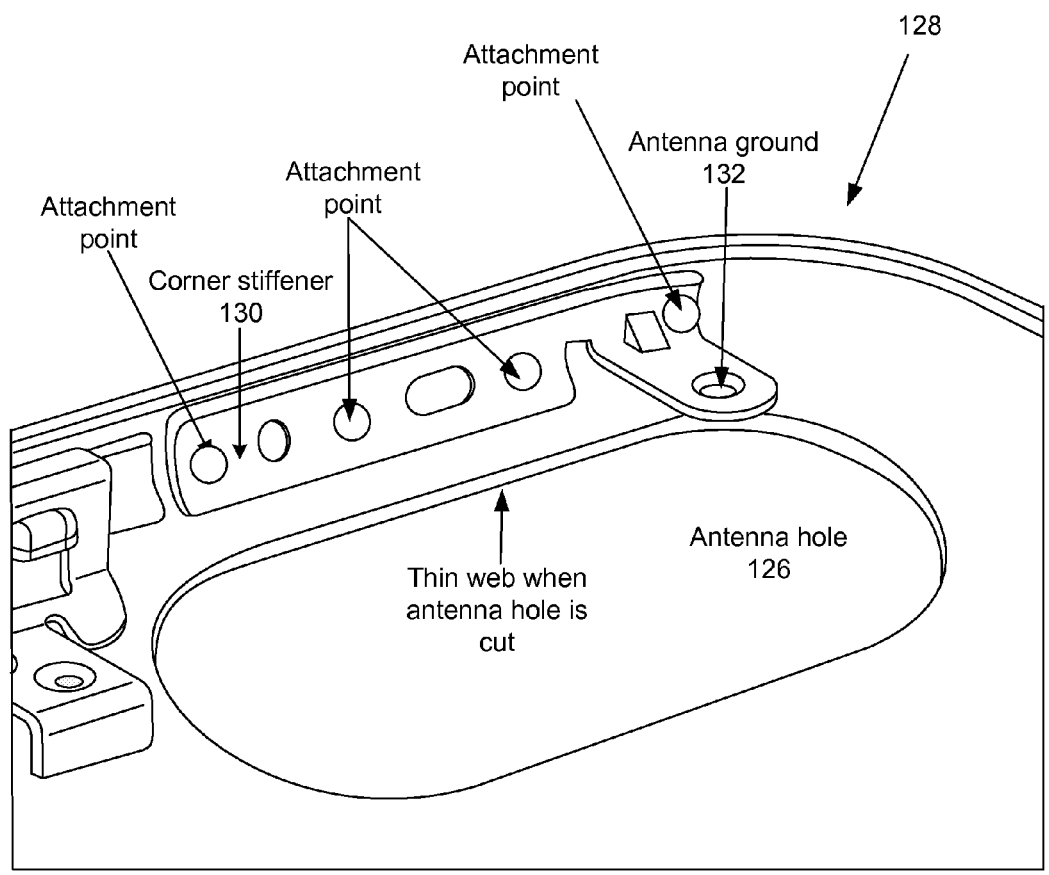
FIG. 13 shows a corner stiffener in accordance with an embodiment of the invention

In order to prevent interference with RF antenna 222, housing material is removed from housing 100 to form antenna hole 126. The antenna hole 126 by removing conductive housing material using a laser and replaced with non-conducting material such as plastic to form antenna cap 120. In this way, the interference caused by the presence of a conducting material such as metal in the immediate vicinity of RF antenna 222 is eliminated. However this cutting away may cause the corner portion 128 of the housing 100 to become weakened to the point where it becomes susceptible to deformation or damage due to an impact event. Therefore, a corner stiffener 130 can be used to provide structural support for the corner portion 128 of the housing 100 by reinforcing the sidewall of housing 100 of the corner portion 128 as shown in FIG. 13. Corner stiffener 130 is welded to or otherwise attached to housing 100. However, in contrast to other support brackets such as those for volume button and dock, the corner stiffener 130 serves two purposes, one to provide additional structural integrity to the corner 128 of housing 100 where material is to be removed and another as a ground for RF antenna 222. In the described embodiment, antenna ground 132 is connected to RF antenna 222 by way of antenna screw 208b. In order to provide good electrical connection between RF antenna 222 and corner stiffener 130, antenna ground 132 must remain substantially intact both in order to mechanically receive antenna screw 208b and provide good electrical contact to corner stiffener 130 (and housing 100).

Due to the size and location of antenna hole 126, a laser is used to remove the necessary amount of material from the housing 100 to form the antenna hole 126. However, the antenna ground 132 extends into the region in close proximity to the material to be lasered off. Since antenna ground 132 must remain relatively intact, antenna ground 132 is protected against any dross generated by the laser removing material to form the antenna hole 126 by a shield formed of for example, foam, or any other protective material that can be easily removed subsequent to the forming of antenna hole 126.

Returning to FIG. 2A showing a detailed view of housing 100. As shown, the housing 100 includes a number of attachment fixtures used for attaching subassemblies to housing 100. Such attachment features can include, for example, PCB subassembly securing fixtures 134a and 134b, and 134c that can be used to attach PCB assembly 200 to housing 100 using fasteners such as screws 310b and screw 208a, respectively. It should be noted that screws 310b attach M-frame assembly 300 and PCB 200 to housing 100 using fixtures 134a and 134b unlike screws 310a that attach M-frame assembly 300 directly to mounting brackets 136a and 136b. As discussed above, RF ground 132 is used to both secure PCB 200 to housing 100 as well as provide a ground plane for RF antenna 222.

Mounting brackets 136a and 136b are used to secure M-frame subassembly 300 to housing 100. However, conventional approaches to attaching mounting brackets to housing 100 utilize high temperature attaching processes, such as laser welding, that can and usually do result in cosmetic damage to the exterior surface of the housing 100. This cosmetic damage can require expensive and time consuming remediation, such as polishing, that can increase the cost of and time required to assembly the portable electronic device 10. Therefore, in order to avoid the creation of the cosmetic damage, only low temperature attachment processes are used to attach mounting brackets 136a and 136b to housing 100. In order to eliminate cosmetic damage caused by high temperature attachment processes (such as laser welding), mounting brackets 136a and 136b are placed in appropriate locations on inside surface of housing 100 using a low temperature weld process. Once positioned, mounting brackets 136a and 136b are securely attached to inside surface of housing 100 using a low temperature solder process. By using low temperature weld and solder processes, any damage, cosmetic or otherwise, to external surface of housing 100 that would have been caused by the attachment of mounting brackets 136a and 136b to housing 100 using conventional methods such as high temperature processes is eliminated. Therefore, in contrast to the conventional approach of using high temperature attachment processes, using low temperature attachment processes eliminates the necessity to perform a post attach polishing or other remediation on the exterior surface of the housing 100. In this way, the aesthetic look and feel of portable electronic device 10 is preserved. In this way, the mounting brackets 136a and 136b provide reference surfaces for receiving and supporting some portion of the internal components. Furthermore, the mounting brackets 136a and 136b provide Z datum bumps 138 that minimize Z height, or stack, tolerance of the assembled internal components discussed in more detail below.

Figure 14:
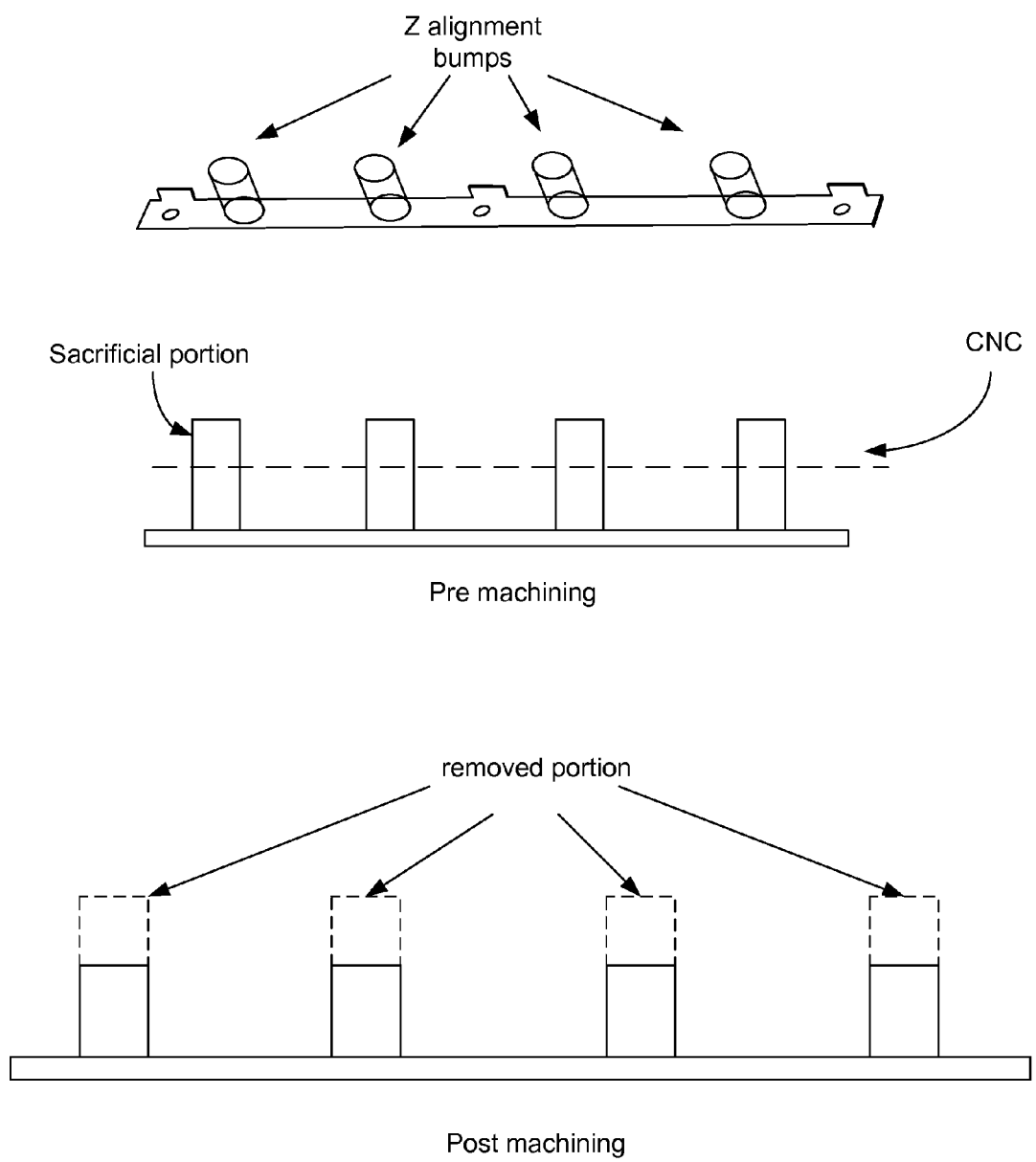
FIG. 14 shows representative sacrificial z alignment bumps pre and post machining.

During the assembly of portable electronic device 10, the PCB 200, M-frame assembly 300 and G unit 400 are placed one atop the other during what is referred to as a blind assembly operation in which each layer must align with each every other layer with minimum Z height tolerance. As well known in the art, whenever a manufacturing operation requires a number of different setups, each separate setup has an associated tolerance each of which is added to all the other tolerances. By minimizing the number of setups in a manufacturing operation, the total Z height tolerance for the operation can be kept to a minimum. Therefore, in order to minimize Z height tolerances in the assembly of portable electronic device 10, a number of novel approaches have been devised. For example, in order to minimize the Z height tolerance in attaching the M-frame assembly 300 to the housing 100, the mounting brackets 136a and 136b include the aforementioned Z datum bumps 138 (where two Z datum bumps are located on either side of M-frame screw hole 146). It should be noted that the Z datum bumps 138, the machined top surface 140 of the housing 100, and display unit alignment holes 142 are machined at the same time using a single set up (as illustrated in FIG. 14). In this way, a Z height tolerance in relation to the top surface 140 of the housing 100 of approximately 0.05 mm can be achieved (compared to a Z height tolerance of approximately 0.2 mm using a standard soldering approach with multiple set ups).

Figure 15:
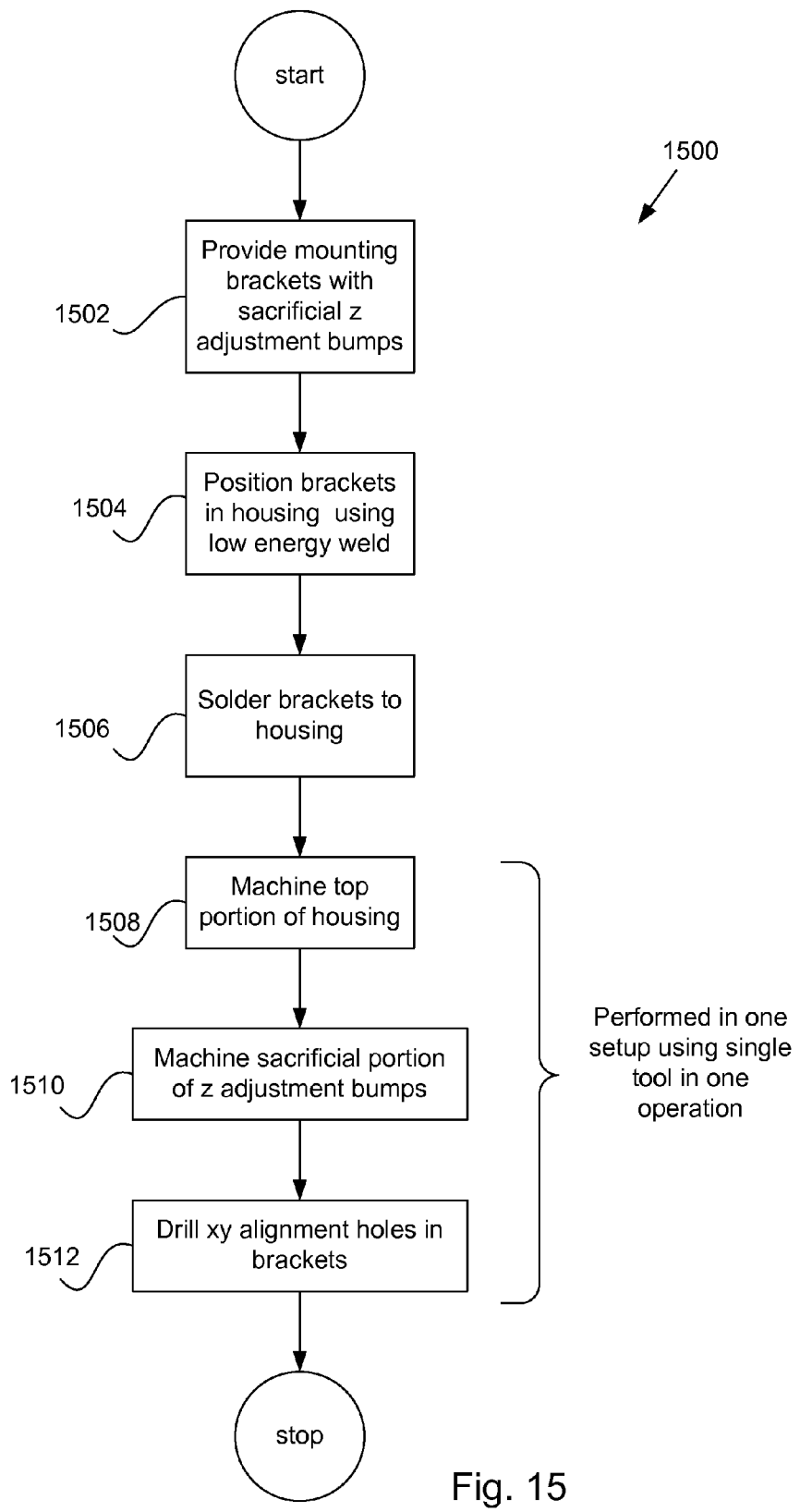
FIG. 15 shows a flowchart detailing a process for installing mounting brackets into a housing in accordance with an embodiment of the invention.

FIG. 15 shows a flowchart detailing a process 1500 for installing mounting brackets into a housing in accordance with an embodiment of the invention. The process 1500 begins at 1502 by providing mounting brackets having sacrificial z adjustment bumps located thereon. In the described embodiment, the z adjustment bumps are arranged to have a portion of which can be machined away during a subsequent machining process during which a top portion of the housing is also machined off. At 1504, the mounting brackets are positioned within the housing using a low energy attachment process such as a low energy weld. Next at 1506, the positioned brackets are soldered in place. The following operations are performed during a single set up, where at 1508 the top portion of the housing is machined off, the sacrificial portion of the z adjustment bumps is removed at 1510, and display unit x,y alignment holes are drilled in the bracket at 1512.

Figure 16:
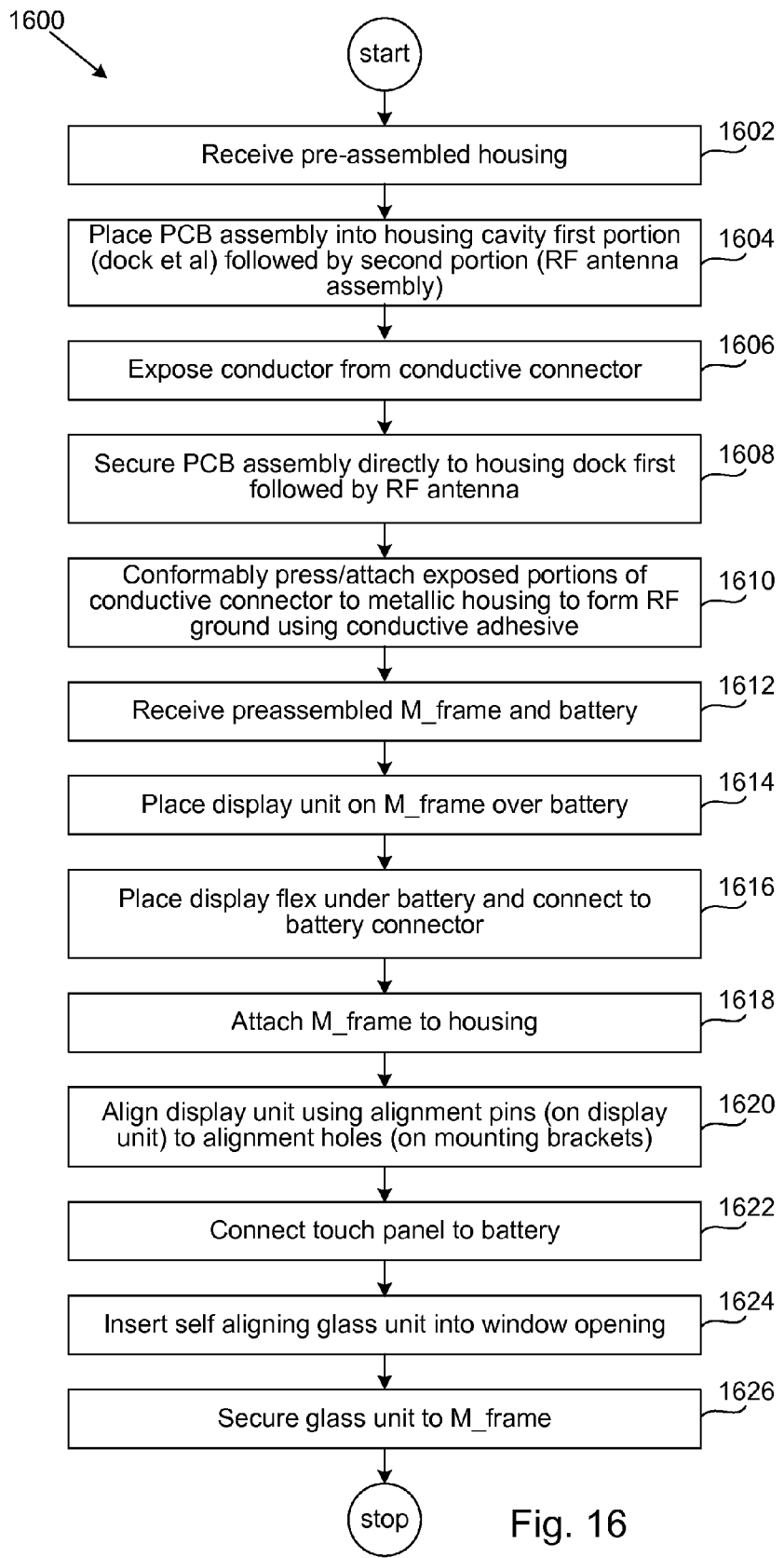
FIG. 16 shows a flowchart detailing a process for assembling the device in accordance with an embodiment of the invention.

FIG. 16 shows a flowchart detailing a process 1600 for assembling the portable electronic device 10 in accordance with an embodiment of the invention. Firstly, at 1602, a pre-assembled housing is received. In the described embodiment, the housing has had all appropriate openings formed, support brackets and attachment fixtures affixed thereto. At 1604, the PCB assembly is placed within the housing cavity. Since the window opening is smaller than the housing body, the insertion of the PCB assembly is done by inserting either the first or the second portion first followed by the remaining portion. For example, when inserting the PCB assembly, if the first portion of the PCB assembly is inserted first, then the dock and the audio jack are inserted into their appropriate openings in the housing. Once the dock and the audio jack are properly seated, then the second portion of the PCB assembly is inserted, which in this case includes the RF antenna assembly. Once the PCB assembly is in place, then a portion of the conductive layer of the flex portion of the PCB assembly is exposed at 1606. It should be noted that this step can be performed anytime prior to the insertion of the PCB into the housing. By exposing a portion of the conductive layer of the flex portion, an RF ground plane can be established by the housing. Once the conductive layer of the flex portion has been exposed, the PCB assembly is secured to the housing at 1608. In the described embodiment, the PCB assembly can be secured using screws to attach the first portion of the PCB assembly including the dock and the audio jack to the housing directly using PCB attachment fixtures. Once the PCB has been secured to the housing, the exposed conductive layer of the flex is conformally pressed to the inside surface of the housing at 1610. In the described embodiment, pressure sensitive conductive adhesive can be used to adhere the exposed portions to the housing. In addition to providing a good electrical contact thereby providing a good RF ground, by pressing the flex onto the inside surface of the housing, the flex is mechanically secured to the housing and also the amount of space taken up by the flex is concomitantly reduced.

Once the PCB is in place and secured, a pre-assembled M-frame and battery are received at 1612. By pre-assembled it is meant that the battery has already been attached to the M-frame by way of the pressure sensitive adhesive (PSA). At 1614, the display unit is placed upon the side of the M-frame opposite to that of the battery. It should be noted that the display unit is not attached to the M-frame at this point since the display unit must be tilted up in order to gain access to the display flex. The display flex is then placed under the battery and electrically connected to the battery electrical connector at 1616. Once the battery and the display unit have been electrically connected to each other, the M-frame assembly, including the battery and the display unit are secured to the housing using a number of available screws at 1618. Again since the display unit is not attached directly to the M-frame, the display unit is lifted in order to gain access to the screw holes in the M-frame.

It should be noted that in the described embodiment, a number of the available screws used to attach the M-frame assembly to the housing utilize mounting brackets attached directly to the housing. These mounting brackets include a number of Z height datum bumps that provide a Z reference for M-frame assembly. In addition, some of the remaining available screws are used to attach the M-frame assembly as well as the PCB to the housing. Once the M-frame has been secured to the housing, the display unit is aligned using a number of alignment pins placed diagonally from each other on either side of the display unit at 1620. The alignment pins can be used to mate with alignment holes in the mounting brackets. At 1622, the touch panel is electrically connected to the battery and at 1624, the glass unit is inserted into the window opening and secured to the M-frame at 1626.

While this invention has been described in terms of several preferred embodiments, there are alterations, permutations, and equivalents, which fall within the scope of this invention. It should also be noted that there are many alternative ways of implementing the methods and apparatuses of the present invention. For example, although an die cast process is preferred method of manufacturing the seamless enclosure, it should be noted that this is not a limitation and that other manufacturing methods may be used. It is therefore intended that the following appended claims be interpreted as including all such alterations, permutations, and equivalents as fall within the true spirit and scope of the present invention.

What is claimed is:

1. A method, comprising:
    providing a single seamless housing, the single seamless housing having a front opening,
    an integral bottom and side walls, wherein the integral bottom and side walls cooperate to form a cavity in cooperation with the front opening;
    placing a cover unit within the front opening, the cover unit having a flat top surface and substantially filling the front opening; and
    attaching the cover unit to the seamless housing without a bezel, wherein the integral bottom wall has a curved bottom surface, the side walls being rounded such that they form a curved side surface and an undercut within the cavity, an inside edge of the side walls surrounding and defining the front opening.

2. The method as recited in claim 1, wherein the flat top surface is substantially flush with an upper surface of the inside edge of the side walls.

3. The method as recited in claim 2, wherein the cover unit is attached to a frame.

4. The method as recited in claim 3, wherein attaching the cover unit to the seamless housing without a bezel comprises:
    attaching the frame to the housing within the cavity.

5. The method as recited in claim 1, wherein the cover unit further comprises:
    a display unit having at least a display screen;
    a cover glass through which the display screen is visible; and
    a substantially transparent touch sensing layer disposed between the cover glass and the display screen.

6. The method as recited in claim 1, wherein the housing is formed of polished stainless steel.

7. The method as recited in claim 1 wherein the cover unit includes an opening suitable for receiving an input mechanism.

8. A method, comprising:
    providing a single seamless housing, the single seamless housing having, an outside edge, an inside edge, a front opening, an integral bottom wall and side walls, wherein the integral bottom wall and side walls cooperate to form a cavity in cooperation with the front opening; and
    attaching a mounting bracket to the integral bottom wall, the mounting bracket arranged to secure at least an electronic assembly to the integral bottom wall of the housing wherein the mounting bracket comprises: at least one mounting bracket datum bump, the at least one mounting bracket datum bump arranged to reduce Z height tolerance between the electronic assembly secured to the integral bottom wall of the housing and an uppermost flat portion of the housing between the inside edge and the outside edge.

9. The method as recited in claim 8, wherein the uppermost flat portion of the housing between the inside edge and the outside edge is a racetrack.

10. The method as recited in claim 9, wherein the at least one mounting bracket datum bump and the racetrack are formed in a single machining operation using a single machine setup.

11. The method as recited in claim 10, wherein the mounting bracket comprises:
    a plurality of sacrificial Z adjustment bumps having a sacrificial portion arranged along the length of the mounting bracket.

12. The method as recited in claim 11, further comprising:
    machining off a top most portion of the seamless housing and the sacrificial portion of the sacrificial Z adjustment bumps; and
    concurrently with the machining, drilling a plurality of XY alignment holes, wherein the machining off and the drilling are performed in the single machine set up.

13. The method as recited in claim 12, further comprising:
    centering the racetrack with respect to outside edge.

14. The method as recited in claim 13, wherein the centering the racetrack comprises:
    optically determining a plurality of reference points on the outside edge of the seamless and cutting the inside edge using the plurality of optical reference points.

15. The method as recited in claim 14, wherein the optically determining a plurality of reference points on the outside edge, comprises:
    taking a series of optical measurements using a camera to measure an outside racetrack profile after a rough cut of the outside racetrack profile is complete.

16. The method as recited in claim 15, wherein the racetrack is centered by forming an inner profile using the optical measurements to find a center $(x_0, y_0)$ and a rotation angle $\phi$ for cutting the inner profile.

* * * * *

UNITED STATES PATENT AND TRADEMARK OFFICE
CERTIFICATE OF CORRECTION

| | | |
|---|---|---|
| PATENT NO. | : 8,250,724 B2 | Page 1 of 1 |
| APPLICATION NO. | : 12/712900 | |
| DATED | : August 28, 2012 | |
| INVENTOR(S) | : Teodor Dabov et al. | |

It is certified that error appears in the above-identified patent and that said Letters Patent is hereby corrected as shown below:

On the Title Page, Item (54) and in the Specification, column 1, line 1: "METHOD FOR HANDHELD COMPUTER DEVICE" should read --METHOD FOR HANDHELD COMPUTING DEVICE--.

In the Claims

Column 20, line 38 (Claim 12, line 7): "set up." should read --setup.--.

Column 20, line 40 (Claim 13, line 2): "outside edge" should read --the outside edge--.

Column 20, line 44 (Claim 14, line 4): "the seamless" should read --the single seamless housing--.

Signed and Sealed this
Thirty-first Day of March, 2015

Michelle K. Lee
*Director of the United States Patent and Trademark Office*